US006937417B2

(12) United States Patent  
Nagaki et al.

(10) Patent No.: US 6,937,417 B2  
(45) Date of Patent: Aug. 30, 2005

(54) DISK DRIVE DEVICE

(75) Inventors: Koichi Nagaki, Tsurugashima (JP);
Kazunori Matsuo, Kawagoe (JP);
Keiichi Yamauchi, Tsurugashima (JP);
Michihiro Kaneko, Tsurugashima (JP);
Tomo Watanabe, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 426 days.

(21) Appl. No.: 09/839,538

(22) Filed: Apr. 23, 2001

(65) Prior Publication Data

US 2002/0021512 A1 Feb. 21, 2002

(30) Foreign Application Priority Data

Apr. 24, 2000 (JP) .................................... 2000-123264
Apr. 24, 2000 (JP) .................................... 2000-123265

(51) Int. Cl.[7] ............................................. G11B 21/02
(52) U.S. Cl. ........................................... 360/75; 360/69
(58) Field of Search ............................. 360/69, 75, 5, 360/6; 701/1, 36, 35; 455/345; 711/112

(56) References Cited

U.S. PATENT DOCUMENTS

| 4,580,222 A | | 4/1986 | Fujii | |
|---|---|---|---|---|
| 4,701,902 A | * | 10/1987 | Aoyagi et al. | 369/77.1 |
| 4,758,959 A | * | 7/1988 | Thoone et al. | 701/221 |
| 4,766,580 A | | 8/1988 | Go et al. | |
| 4,786,995 A | | 11/1988 | Stupeck et al. | |
| 4,860,124 A | * | 8/1989 | Adams | 360/6 |
| 4,862,364 A | | 8/1989 | Matsuda | |
| 4,891,760 A | | 1/1990 | Kashiwazaki et al. | |
| 5,467,277 A | * | 11/1995 | Fujisawa et al. | 701/51 |
| 5,550,738 A | | 8/1996 | Bailey et al. | |
| 5,794,164 A | * | 8/1998 | Beckert et al. | 455/3.06 |
| 5,889,629 A | * | 3/1999 | Patton, III | 360/75 |
| 6,236,918 B1 | * | 5/2001 | Sonoda et al. | 701/36 |
| 6,335,910 B1 | * | 1/2002 | Yoshizawa et al. | 369/53.18 |
| 6,427,103 B2 | * | 7/2002 | Kobayashi et al. | 701/36 |
| 6,434,459 B2 | * | 8/2002 | Wong et al. | 701/36 |
| 6,442,461 B2 | * | 8/2002 | Matsuo | 701/35 |
| 6,546,456 B1 | * | 4/2003 | Smith et al. | 711/112 |
| 6,633,448 B1 | * | 10/2003 | Smith et al. | 360/69 |

FOREIGN PATENT DOCUMENTS

| EP | 0 962 928 A1 | 12/1999 |
|---|---|---|
| JP | 5-157573 | 6/1993 |
| JP | 2000-293923 | 10/2000 |

* cited by examiner

Primary Examiner—David Hudspeth
Assistant Examiner—K. Wong
(74) Attorney, Agent, or Firm—McGinn & Gibb, PLLC

(57) ABSTRACT

A disk drive device in which emergency unloading at the start of the engine is prevented, a head may have a prolonged life and improved reliability as an HDD is achieved. A disk drive device is driven or the movement of a magnetic head is allowed after an engine start in a vehicle is detected by an engine start detecting part, so that emergency unloading can be prevented at the start of the engine. In order to detect the engine start, voltage values on four power supply lines for a vehicle power supply device are monitored or the outputs of various sensors such as a tachometer, a vibration detection sensor, an engine sound detection sensor, a vehicle speed pulse, a gyro sensor and a parking brake are monitored. In another embodiment, the number of emergency unloading occurrence at the start of the engine is reduced, which allows the head to have a prolonged life, so that the disk drive device has improved reliability as an HDD. The voltage values on two power supply lines, first and second power supply lines for a vehicle power supply device are monitored. The magnetic head is allowed to move when the voltage values on the first and second power supply lines attain a prescribed value after a prescribed time period after the voltage value on the first power supply line attains prescribed value.

25 Claims, 18 Drawing Sheets

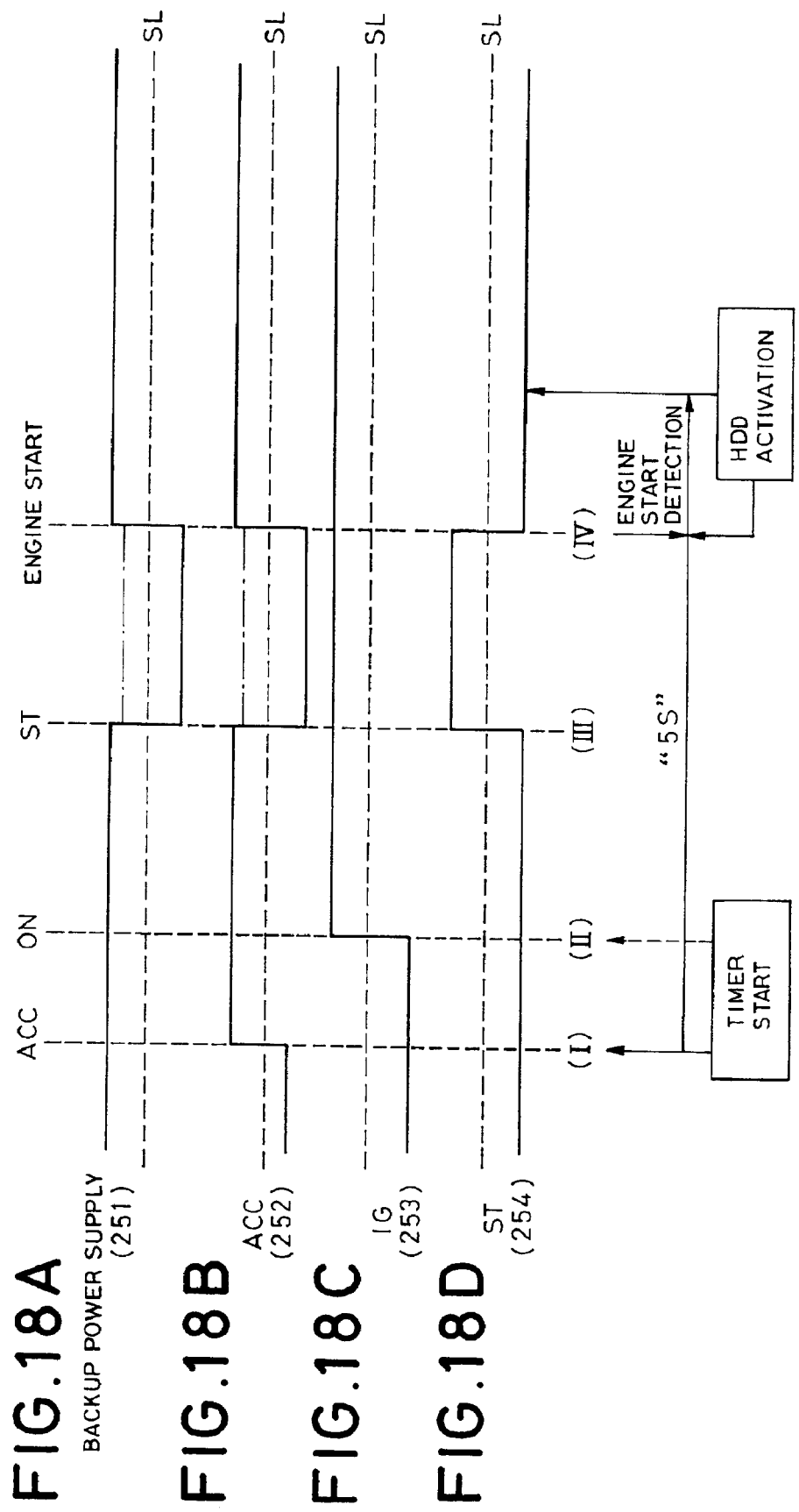

US 6,937,417 B2

DISK DRIVE DEVICE

BACKGROUND OF THE INVENTION

1. Field of the Invention

The present invention relates to disk drive devices to drive an information recording disk such as a magnetic disk.

2. Description of Related Art

The hard disk drives (HDDS) have widely spread as an external storage device for a personal computer. Meanwhile, the HDD has been reduced in price as the recording density has increased, and today, some home electric appliances have an internal HDD. The HDD can store a considerable amount of video and music contents and various products with an HDD are on the way to the market. Car audio equipment is a prospective item to be provided with an HDD. Car navigation systems mainly use DVDs as the storage, while the use of HDD is expected in the future.

The basic construction of an HDD is shown in FIG. 1. The shown HDD is a ramped loading type device in which a magnetic head 51 provided at a tip end of an actuator 54 is mechanically raised from the magnetic disk surface to float.

As shown, the magnetic head 51 attached to the actuator 54 is provided movably in the radial direction (denoted by the arrow) of the magnetic disk 53 and positioned by a voice coil motor (VCM) 160. The magnetic head 51 is pressed against the surface of the magnetic disk 53 by the elasticity of a suspension 57. Meanwhile, the rotation of the magnetic disk 53 controls the distance between the disk surface of magnetic disk 53 and the magnetic head 51 to be several tens pm by the aerodynamic floatation acting upon the magnetic head 51. In an inactive state, the magnetic head 51 is positioned at a retreat position where the head 51 is placed over the tapered portion 56 of a ramp 55 formed at one end of a casing frame 50.

The positional relation between the magnetic head 51 and the ramp 55 is shown in a sectional view in FIG. 2. As shown, the ramp 55 positioned in the vicinity of the outer circumference of the magnetic disk 53 has the tapered portion 56 gradually tapered height-wise, outward in the radial direction of the disk from the surface of the magnetic disk 53. The magnetic head 51 is positioned at a location a at a prescribed distance from the main surface of the magnetic disk 53 at the time of reading/writing information from/to the magnetic disk 53 (at the time of driving). In an inactive state (unloaded state), the head is placed over the tapered portion 56 as denoted by the arrow in the figure, regains a retreat position, i.e., a home position b and stands by.

The above described HDD has a function called "emergency unloading." By the emergency unloading function, the head 53 is forcibly moved to the retreat position, i.e., the home position. This is carried out in order to prevent the magnetic disk 53 from being damaged by the head when the power supply voltages to a spindle motor 52 and a motor for driving the magnetic head 51 are significantly lowered. A power supply is necessary to carry out this emergency unloading function. Meanwhile, according to one known technique, counter electromotive force, in other words, no-loaded electromotive force generated by the inertial rotation of the spindle motor 52 is used to perform the operation when the power supplies are both down as described above.

When this technique is applied to a disk drive device mounted in an engine driven vehicle, as the battery voltage significantly drops at the start of the engine, the above emergency unloading operation is performed each time the engine is started.

FIG. 3 shows an example of a power supply circuit in an engine driven vehicle. More specifically, an alternator G is driven by an engine which is not shown. An alternate power supplied from the alternator G is rectified and smoothed by a rectifier D and supplied to a battery B. The battery voltage Vb of the battery B is supplied to a movable terminal m of an engine key switch SW. The engine key switch SW has fixed terminals ACC, ON and ST, and the battery voltage Vb passed through the terminal ACC is supplied to a light load such as audio equipment as an ACC power supply. The battery voltage Vb passed through the terminal ON is supplied to a heavy load HL such as a power window as an ON power supply. The battery voltage Vb passed through the terminal ST is supplied to a starting motor which is not shown as an MST voltage and rotates the starting motor for starting the engine. Meanwhile, the battery voltage Vb is supplied to the light load LL as a backup power supply through a line BU.

FIGS. 4A and 4B are timing charts showing how a voltage on a power supply lines changes at the start of the engine. FIG. 4A shows how the backup power supply voltage changes, while FIG. 4B shows how the ACC voltage changes. The timings (I), (II), (III) and (IV) as shown correspond to positions of the key switch of the engine key. In the timing (I), the engine key is at the "ACC position" where power is supplied to a light load such as audio equipment. In the timing (II), the engine key is at the "ON position" where power is supplied to a heavy load such as a power window. In the timing (III), the key switch is in the "ST position" where power is supplied to the starting motor. In the timing (IV), the starting motor has started and the engine key regains the "ON position."

During the operation, at the start of the engine, a drop in the battery voltage could cause a drop not only in the ACC voltage but also the backup power supply voltage (during the period from (III) to (IV) in FIG. 4).

Therefore, if an HDD is provided in an engine-driven vehicle, a possible drop in the power supply voltage at the start of the engine is likely to cause the above described emergency unloading every time the engine is started. In the emergency unloading operation, the counter electromotive force of a spindle motor is used to force the head to move. Therefore, in products for vehicles, the magnetic head 51 more often collides with the tapered portion 56 of the ramp 55 before the head 51 reaches the stand-by position b of the ramp 55 than the case of other kinds of products such as personal computers. More specifically, in the HDD for vehicle, the ramp 55 and the magnetic head 51 must have higher durability. This is a common disadvantage among disk drive devices operated with unstable power supply voltages.

SUMMARY OF THE INVENTION

It is an object of the present invention to provide, in an HDD for vehicle, a disk drive device for vehicle allowing emergency unloading to be prevented at the start of the engine, and having a floating head slider with a prolonged life and improved reliability as an HDD.

The present invention is directed to the above circumstances, and another object of the invention is to provide a disk drive device allowing the number of emergency unloading to be reduced, thus prolonging the life of a floating head slider, and achieving improved reliability as an HDD.

In order to achieve the above described objects, a disk drive device according to a first aspect of the present invention includes an information recording disk and is driven by a power supply voltage in a vehicle. The disk drive device includes an engine start detecting part for detecting an engine start of the vehicle, and the disk drive device is driven after an engine start of the vehicle is detected.

Thus, emergency unloading at the start of the engine can be prevented, and the reduction in emergency unloading occurrence reduces the number of collisions between the head and the ramp. As a result, the head may have a prolonged life and the disk drive device can achieve improved reliability as an HDD.

A disk drive device according to a second aspect of the present invention includes an information recording disk and is driven by a vehicle power supply voltage. The disk drive device includes a head for reading/writing information from/to the information disk, a head driving part for giving a driving instruction to the head, an engine start detecting part for detecting an engine start of the vehicle, and a head movement allowing part for allowing the head to be moved by the head driving part after an engine start of the vehicle is detected by the engine start detecting part.

Thus, the HDD becomes accessible after the engine is activated, and therefore emergency unloading occurrence at the start of the engine can be prevented. The reduction in emergency unloading occurrence reduces the number of collisions between the head and the ramp, so that the head may have a prolonged life and the disk drive may achieve improved reliability as an HDD.

A disk drive device according to a third aspect of the present invention further includes in the disk drive device according to the first or second aspect of the invention, a forcible moving part for forcibly moving the head to a retreat position when the power supply voltage in the vehicle is interrupted.

A disk drive device according to a fourth aspect of the present invention is based on the third aspect of the invention, and the forcible moving part forcibly moves the head to the retreat position by providing the head driving part with counter electromotive force generated by the inertial rotation of a spindle motor driving the recording medium to rotate. Thus, the head can surely be returned to the retreat position if the power supply is interrupted, so that the HDD including the head can be prevented from being critically damaged.

A disk drive device according to a fifth aspect of the present invention further includes in the disk drive device according to the first to fourth aspects of the invention, a voltage value monitoring circuit for monitoring voltage values on a first power supply line provided with a backup power supply and a second power supply line provided with a power supply when an engine key is inserted and turned from a first position to a second position. The engine start detecting part outputs an engine start detection signal when the voltage value on the second power supply line reaches a prescribed value, and then the value on the first power supply line or the values on the first power supply line and the second power supply line become lower than the prescribed value and then higher than the prescribed value, based on an output value from the voltage value monitoring circuit.

Thus, the start of the engine can be detected by monitoring the voltages, and therefore the HDD may be activated or the head is allowed to move after the detection. As a result, emergency unloading can be prevented at the start of the engine, and the reduction in emergency unloading occurrence reduces the number of collisions between the head and the ramp, so that the head may have a prolonged life and the disk drive device may have improved reliability as an HDD.

A disk drive device according to a sixth aspect of the present invention further includes in the disk drive device according to any one of the first to fourth aspects of the present invention, a voltage value monitoring circuit for monitoring a voltage value on a third power supply line provided with a power supply when an engine key is turned from a second position to a third position, and a voltage value on a fourth power supply line provided with a power supply when the engine key is turned from the third position to a fourth position. The engine start detecting part outputs an engine start detection signal when the voltage value on the second power supply line or the third power supply line reaches a prescribed value, and then the value on the first power supply line or the values on the first power supply line and the second power supply line become lower than the prescribed value and then higher than the prescribed value, based on an output value from the voltage value monitoring circuit.

Thus, the start of the engine can be detected by monitoring the voltages, and the HDD may be activated or the head is allowed to move after the detection. As a result, emergency unloading at the start of the engine can be prevented, and the reduction in emergency unloading occurrence reduces the number of collisions between the head and the ramp, so that the head may have a prolonged life and the disk drive device may have improved reliability as an HDD.

A disk drive device according to a seventh aspect of the present invention is based on any one of the first to fourth aspects of the present invention, and the engine start detecting part outputs a signal validated when an output of a tachometer of the engine is sensed.

A disk drive device according to an eighth aspect of the present invention is based on any one of the first to fourth aspects of the invention, and the engine start detecting part outputs a signal validated when the vibration of the engine inside and outside the vehicle is sensed.

A disk drive device according a ninth aspect of the present invention is based on any one of the first to fourth aspects of the invention, and the engine start detecting part outputs a signal validated when an engine sound is sensed.

A disk drive device according to a tenth aspect of the present invention is based on any one of the first to fourth aspects of the invention, and the engine start detecting part outputs a signal validated when the traveling of the vehicle is detected based on a vehicle speed pulse.

A disk drive device according to an eleventh aspect of the present invention is based on any one of the first to fourth aspects of the invention, and the engine start detecting part outputs a signal validated when the traveling of the vehicle is detected using a gyro sensor.

A disk drive device according to a twelfth aspect of the present invention is based on any one of the first to the fourth aspects of the invention, and the engine start detecting part outputs a signal validated when the operation position of a parking brake is sensed.

A disk drive device according to a thirteenth aspect of the present invention is based on any one of the first to fourth aspects, and the engine start detecting part outputs a signal validated when an operation of a generator in the vehicle is sensed.

A disk drive device according to a fourteenth aspect of the present invention is based on any one of the first to fourth aspects of the invention, and the engine start detecting part outputs a signal validated when the activation of a starter-motor is sensed.

Thus, the engine start can be detected based on the outputs of various sensors or by detecting the traveling of the vehicle, and emergency unloading at the start of the engine can be prevented by activating the HDD or allowing the head to move after the detection. As a result, emergency unloading at the start of the engine can be prevented, and the reduction in the emergency unloading occurrence reduces the number of collisions between the head and the ramp. Therefore, the head may have a prolonged life and the disk drive device may achieve improved reliability as an HDD.

A disk drive device according to a fifteenth aspect of the present invention is based on any one of the tenth to fourteenth aspects of the invention, and map information in the previous off state of the engine is backed up in a memory. The information is displayed on a screen in response to detection of a power supply being provided to the second power supply line. Thus, a map is displayed as the driver waits for the HDD to be driven, and therefore the driver may be relieved from vexation during the waiting.

In order to achieve the above described objects, a disk drive device according to a sixteenth aspect of the present invention is driven by a vehicle power supply voltage in a vehicle. The disk drive device includes a counter for starting counting operation based on a prescribed signal related to a key switch in the vehicle and a controller for driving the disk drive device when the counter has counted a first prescribed time period.

A disk drive device according to a seventeenth aspect of the present invention is driven by a power supply voltage in a vehicle. The disk drive device further includes a head for reading/writing information from/to a recording medium mounted to the disk drive device, a head driving part for giving a driving instruction to the head, a counter for starting counting operation based on a prescribed signal related to a key switch in the vehicle and a head movement allowing part allowing the head to be moved by the head driving part when the counter has counted a first prescribed time period.

A disk drive device according to an eighteenth aspect of the present invention is based on the sixteenth or seventeenth aspect of the present invention. The disk drive device further includes a power supply part for providing a power supply voltage to each part of the disk drive device in connection with the key switch in the vehicle. The counter starts counting operation after the power supply voltage by the power supply part is supplied to the disk drive device by the key switch.

A disk drive device according to a nineteenth aspect of the present invention is based on the sixteenth to eighteenth aspects of the present invention. The disk drive device further includes a voltage monitoring circuit for monitoring a voltage value at the power supply part. The controller detects a voltage value result at the voltage monitoring circuit after the first prescribed time period, controls the counter to count again when the voltage value is lower than a prescribed value, and controls the disk drive device to be driven when the counter has counted a second prescribed time period.

A disk drive device according to a twentieth aspect of the present invention is based on any one of the sixteenth to nineteenth aspects of the present invention. The disk drive device further includes forcible moving part forcibly moving the head to a retreat position when the power supply voltage at the vehicle is interrupted.

A disk drive device according to a twenty-first aspect of the present invention is based on any one of the sixteenth to twentieth aspects of the present invention. The forcible moving part forcibly moves the head to a retreat position by providing the head driving part with counter electromotive force generated by the inertial rotation of a spindle motor driving the recording medium to rotate.

A disk drive device according to a twenty-second aspect of the present invention is based on any one of the sixteenth to twenty-first aspect of the present invention. The disk drive device further includes an engine start detecting part for detecting a start of an engine in the vehicle. The controller controls the disk drive device to be driven when an engine start of the vehicle is detected by the engine start detecting part during the operation of the counter counting said first prescribed time period.

By the above-described constructions, for a vehicle without a voltage drop at the start of the engine, the engine start can be detected by monitoring using a timer. Meanwhile, for a vehicle with a voltage drop, a disk drive device can be started in an earlier timing. The head is allowed to move after the detection time point, so that emergency unloading at the start of the engine may be minimum, or avoided. Therefore, emergency unloading occurrence may be reduced, which reduces the number of collisions between the head and the ramp, so that the head may have a prolonged life and the disk drive device may have improved reliability as an HDD for vehicle.

BRIEF DESCRIPTION OF THE DRAWINGS

FIGS. 18A to 18D are timing charts for illustrating the operation of an engine start detecting device according to the embodiment shown in FIG. 17.

DETAILED DESCRIPTION OF THE PREFERRED EMBODIMENTS

Figure 1:
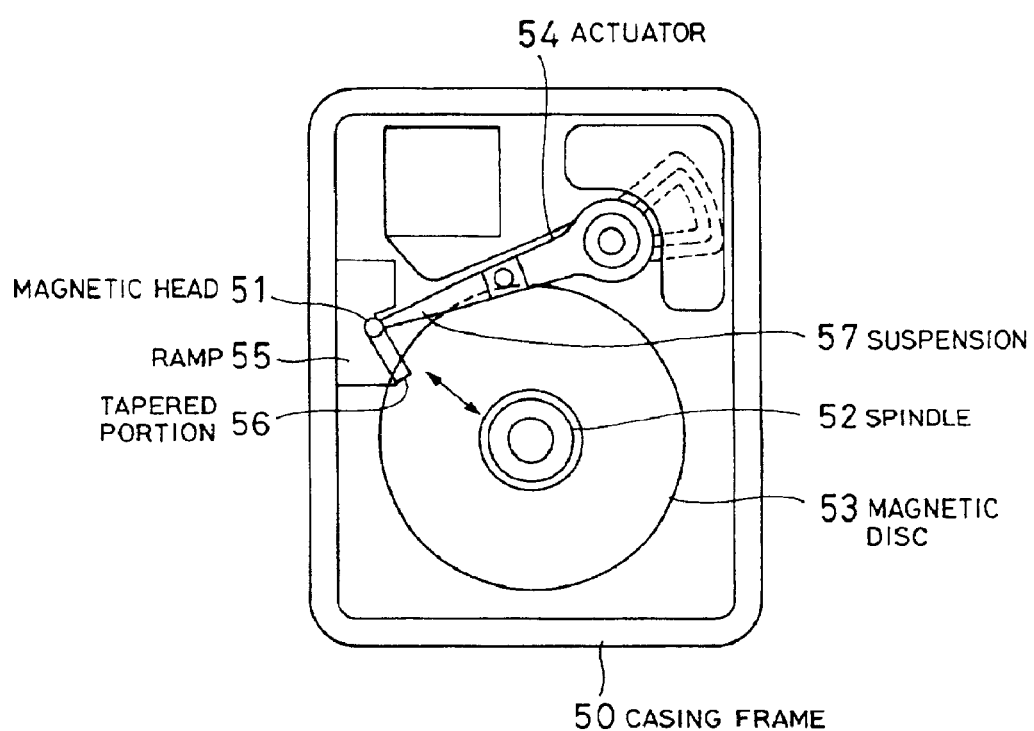
FIG. 1 is a plan view of the basic structure of a ramped loading type HDD.
Figure 2:
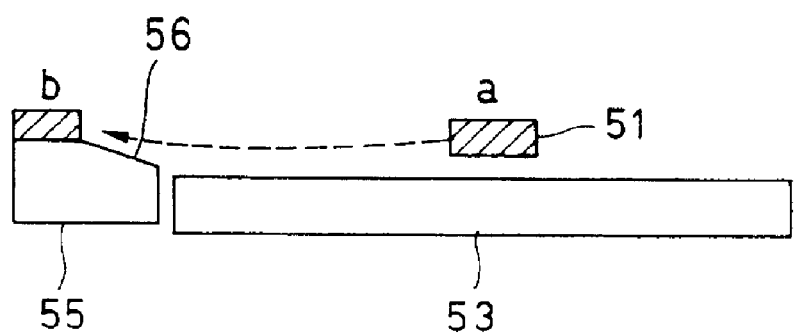
FIG. 2 is a sectional view for use in illustration of the positional relation between the ramp and the head in FIG. 1.
Figure 3:
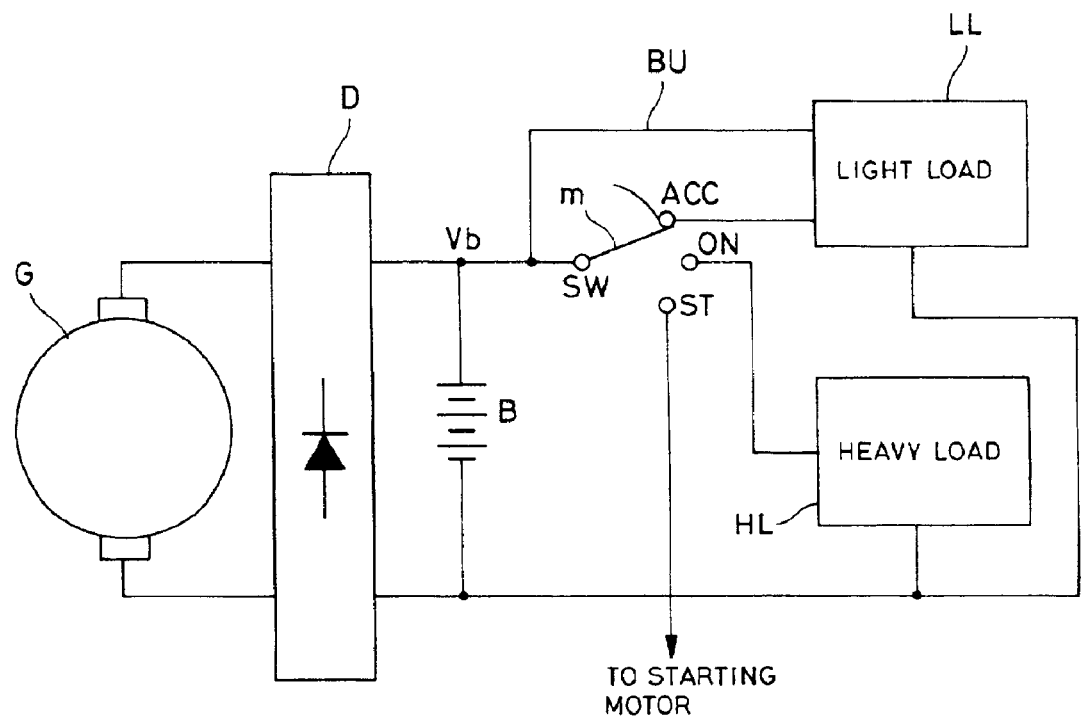
FIG. 3 is a block diagram of a power supply system in an engine driven vehicle.
Figure 4:
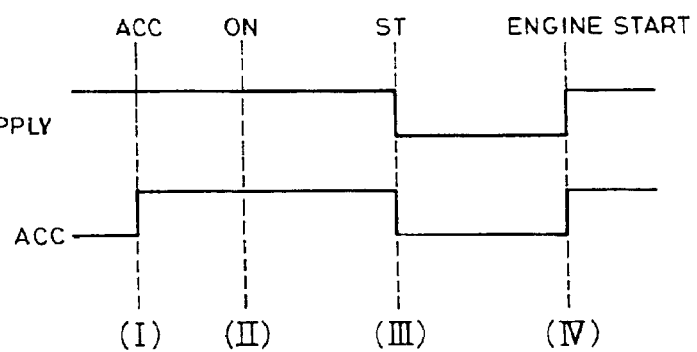
FIGS. 4A and 4B are timing charts for use in illustration of changes in power supply voltages at the start of the engine.
Figure 5:
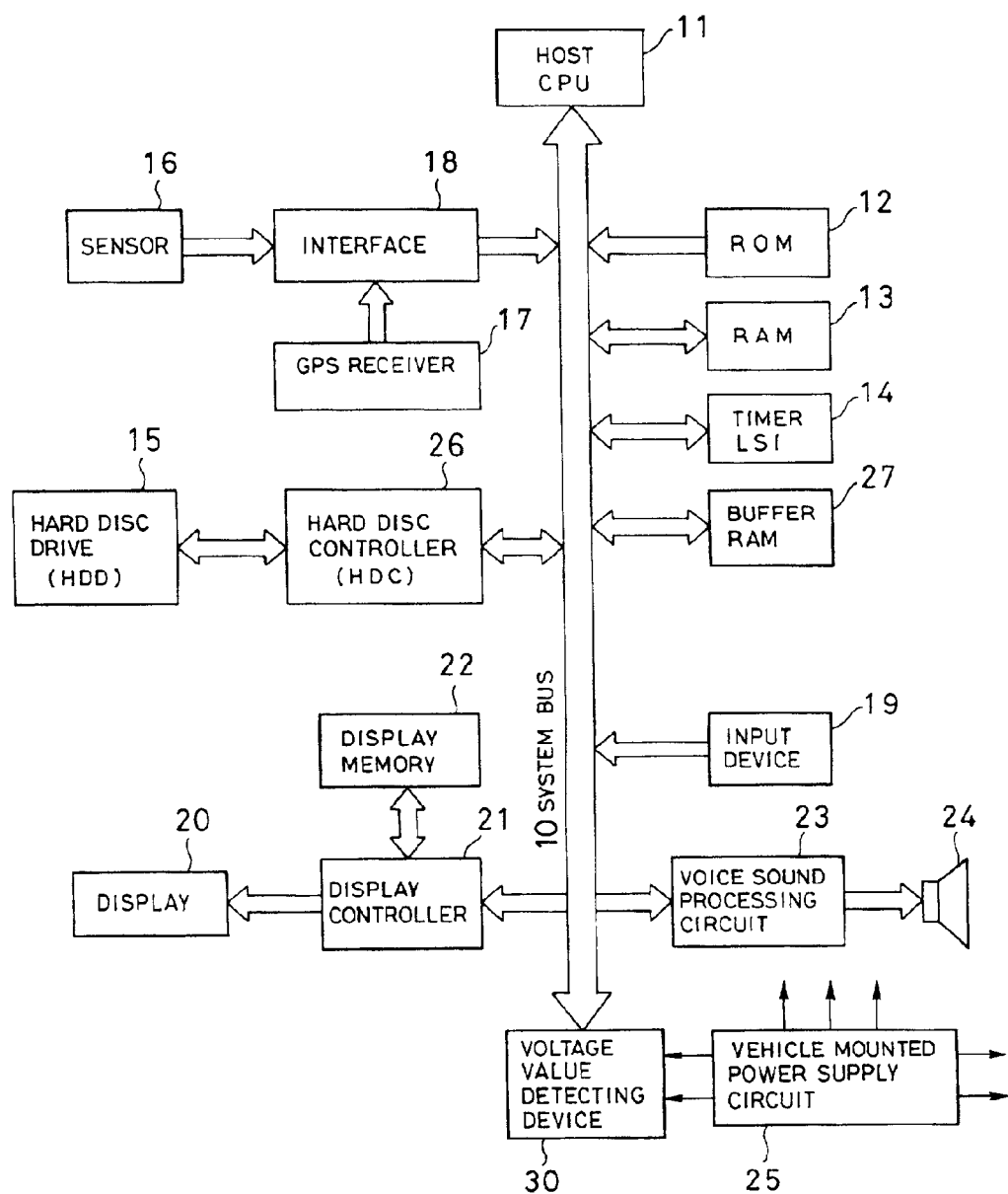
FIG. 5 is a block diagram of a car navigation system including an HDD according to the present invention.

FIG. 5 is a block diagram showing the configuration of a car navigation system provided with a disk drive device according to the present invention. Herein, an HDD is used rather than a DVD as a map information storing part for a car navigation system by way of illustration. Note that while the present invention is not limited to the car navigation system, but also applicable to anything provided with an HDD in audio equipment for vehicle, the car navigation will be described as one embodiment. The disk drive device according to the present invention includes a host CPU 11 as a main feature of control, a ROM 12, a RAM 13, a timer LSI 14, a hard disk drive (HDD) 15, a sensor 16, a GPS receiver 17, an interface 18, an input device 19, a display 20, a display controller 21, a display memory 22, a voice sound processing circuit 23, a speaker 24, a power supply circuit for vehicle 25, a hard disk controller HDC 26, and a backup RAM 27.

The host CPU 11 achieves general control of navigation such as searching the location of a destination and directing a route based on programs stored in the ROM 12 and the RAM 13, and also controls units 12, 13, 14, 27, 19, 23, 18, 26 and 21 connected to a system bus 10. A timer LSI 14 has its time count value set in a programmable manner by the host CPU 11, and issues an interrupt at time up to let the interrupt processing routine to take over the processing. Here, the driving timing of the HDD after the start of the engine is specified.

The HDD 15 is provided with a measure to prevent emergency unloading according to the present invention, and is connected with the system bus 10 through the HDC 26. The HDC 26 carries out format control of a magnetic disk mounted to the HDD 15, and also serves as a host interface and an HDD interface. The sensor 16 includes a group of sensors required by a car navigation system for autonomous traveling, and for example includes a vehicle speed sensor and a gyro sensor. The sensor 16 is connected with the system bus 10 through the interface 18. The interface 18 is supplied with the output of the GPS receiver 17, and hybrid traveling control based on the GPS-measured position and autonomous traveling is carried out.

The display 20 includes a liquid crystal display monitor and a processing content such as map information written by the host CPU 11 in the display memory 22 is read by a display controller 21 for display. According to the present invention, during the period between the supply of ACC power supply and the activation of the HDD or for a while after the activation, map information representing the position of the vehicle itself at the previous engine termination which has been written in the backup RAM 27 is displayed.

The input device 19 is a remote control device or console used as a GUI for inputting commands or communication between the navigation system and the display 20. The voice sound processing circuit 23 serves as a GUI by emitting a voice sound guide or receiving an input voice sound for communication with the navigation system. The voice sound guide is output through the speaker 24. A power supply circuit 25 for vehicle includes a backup power supply line (constant power supply line) and an ACC power supply line as described above.

Figure 6:
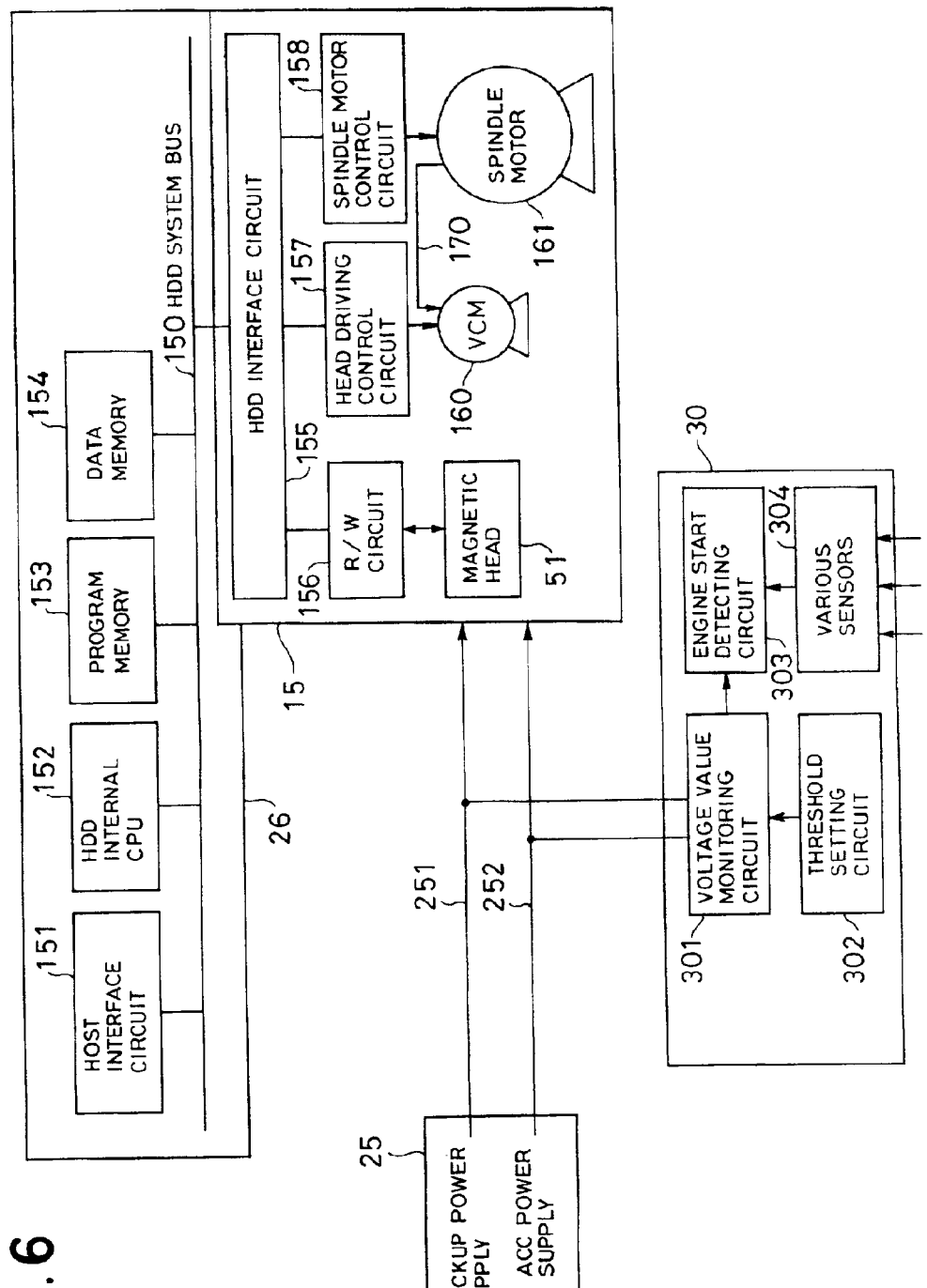
FIG. 6 is a block diagram of the HDD in the system of FIG. 5.

FIG. 6 is a diagram showing in detail the configuration of the HDD 15 and the power supply circuit 25 in FIG. 5 and an engine start detecting device 30 for detecting the start of the engine. As shown, the power supply circuit 25 for vehicle includes two power supply lines, a backup power supply line 251 and an ACC power supply line 252.

The HDD 15 includes an internal CPU 152 as a main feature, a host interface circuit 151, a program memory 153, a data memory 154, an HDD interface circuit 155, an R/W (reading/writing) circuit 156, a head driving control circuit 157, a spindle motor control circuit 158, a magnetic head 51, a voice coil motor (VCM) 160, and a spindle motor 161.

The above described host interface circuit 151, the internal CPU 152, the program memory 153, the data memory 154, and the HDD interface circuit 155 are connected in common to the HDD system bus 150.

The internal CPU 152 receives a command (such as Seek, Read/Write) from the host CPU 11 in FIG. 5 through the host interface 151, and carries out the command control through the HDD interface circuit 155 according to a program stored in the program memory 153. Data read/written from/to a magnetic disk through the magnetic head is controlled by the R/W circuit 156, while the VCM motor 160 is driven under the control of the head driving control circuit 157. The spindle motor 161 is driven under the control of the spindle motor control circuit 158. Note that counter electromotive force generated by the inertial rotation of the spindle motor when the power supply is off is supplied from the spindle motor 161 to the head driving control circuit 157 through a line 170.

The engine start detecting device 30 includes a voltage value monitoring circuit 301, a threshold setting circuit 302, an engine start detecting circuit 303, and a group of sensors 304. The voltage value monitoring circuit 301 monitors the voltage values on the backup power supply line 251 and ACC power supply line 252 supplied from the two power supplies described above, and notifies the engine start detecting circuit 303 of the values. A threshold value to detect a momentary shutoff is set at the threshold setting circuit 304, and the engine start detecting circuit 303 is notified of the value. The engine start detecting circuit 303 obtains voltage value data from the voltage value monitoring circuit 301 and the threshold setting circuit 302 and then supplies an activation signal to the HDD in response to a detected engine start timing according to the process as will be described.

The engine start detecting circuit 303 is connected with the group of sensors 304 as an option. In this case, a signal to trigger detection of the engine start timing must be received and internal program-wise determination is necessary without the voltage value monitoring operation as described above. Therefore, program logics by microcomputers or the like are used for monitoring and control. In this case, as the group of sensors 304, a tachometer, a vibration sensor, a starter-motor, a generator and the like would thus be necessary in addition to the sensor 16 provided as part of the car navigation system. These will be detailed.

The activation timing of the HDD according to the present invention will be now described. According to the embodiment, the start of the engine is detected, so that after a momentary shutoff, the activation of the HDD is controlled and emergency unloading at the start of the engine is prevented. As the part for detecting the start of the engine, the case of monitoring the voltage values on the backup power supply line 251 and the ACC power supply line 252 will be described by way of illustration.

Figure 7:
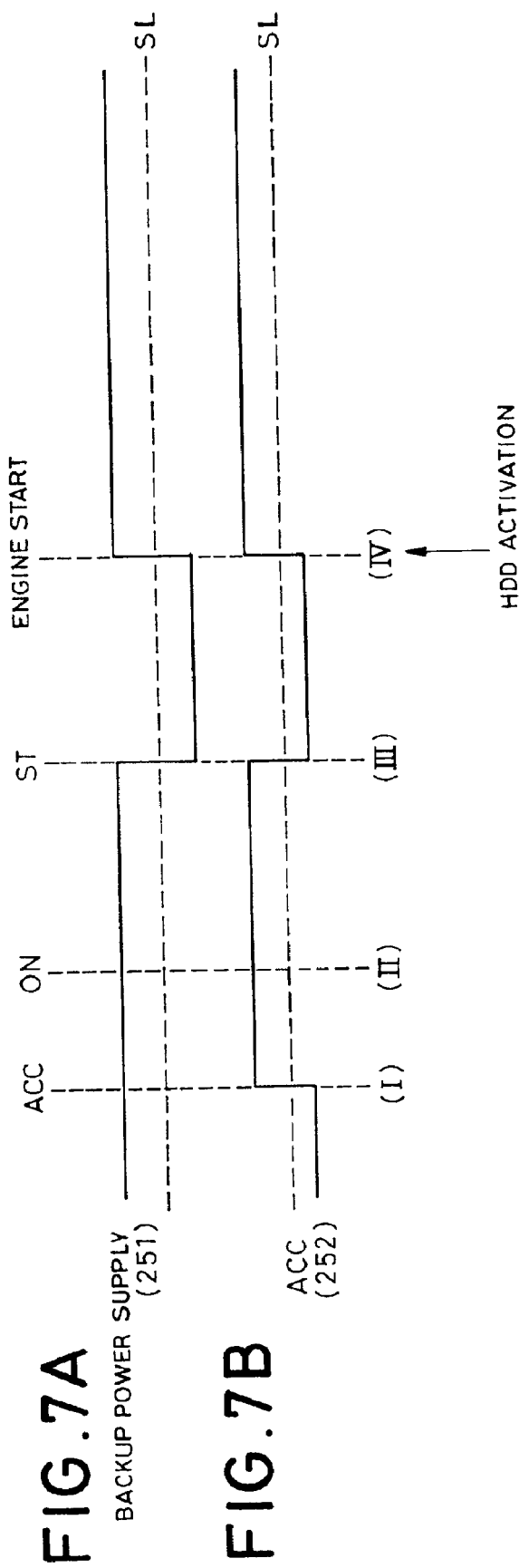
FIGS. 7A and 7B are timing charts for use in illustration of an example of the operation of an engine start detecting device in the HDD in FIG. 6.

FIGS. 7A and 7B are timing charts for use in illustration of the timing of detecting the start of the engine using the engine start detecting device 30. FIG. 7A shows the voltage waveform at the backup power supply line 251, while FIG. 7B shows the voltage waveform at the ACC power supply line 252. A threshold value SL is a prescribed voltage value, 9V for example according to the embodiment. This value is set so that the voltage value at a momentary shutoff caused at the vehicle is lower than SL.

The driver inserts the engine key in the LOCK position to release the lock, and turns the key to the ACC position (I). Thus, the ACC power supply rises for example to 12V, and the key is then turned to the ST position (III) through the ON position (II), which starts the starter-motor and voltage falls both on the backup power supply line 251 and the ACC power supply line 252. After a prescribed time period, the engine starts (IV), and the ACC power supply line 252 and the backup power supply line 251 rise again to the original voltage value 12V, and a steady state is regained. Note that the time period between the ACC position, the start of the starter-motor and the start of the engine is random. Here, in order to make sure that the emergency unloading is avoided, the engine start position (the position IV) needs only be detected, and then an activation instruction may be given to the HDD. Therefore, the engine start detecting circuit 303 monitors if the voltage value on the ACC power supply line 252 exceeds the level of a prescribed threshold value SL through the voltage value monitoring circuit 301. If it exceeds the threshold value SL, the engine key has come to the position of ACC, and it is then monitored whether or not the engine is provided with a power supply. More specifically, the engine start detecting circuit 303 monitors the voltage value on the backup power supply line 251 through the voltage value monitoring circuit 301. It is monitored whether or not the voltage value on the backup power supply line 251 is lower than the prescribed threshold value SL. Here, it may be possible to monitor whether or not the two power supply lines, the backup power supply line 251 and the ACC power supply line 252 are both below the prescribed threshold value SL, while monitoring only the ACC power supply line 252 does not allow the start of the engine to be surely detected. This is because the engine key may be returned to the position of the key LOCK from the ACC position. Therefore, after the backup power supply line 251 becomes higher than the prescribed threshold value SL, the backup power supply line 251 or the two power supply lines, the backup power supply line 251 and the ACC power supply line 252 must be monitored.

When the voltage value on the power supply line is lower than the prescribed threshold value SL, the engine key has come to the ST position (III) through the ACC position (I) and the ON position (II), it is monitored whether the engine starts or not. More specifically, the engine start detecting circuit 303 monitors whether the voltage value on the backup power supply line 251 exceeds the prescribed threshold value SL through the voltage value monitoring circuit 301. If it exceeds the prescribed threshold value SL, the engine has started, and therefore an instruction signal corresponding to the start of the engine is supplied to the HDD 15. Note that in the detection of the start of the engine, it can be monitored whether or not the two power supply lines, the backup power supply line 251 and the ACC power supply line 252 are higher than the prescribed threshold value SL.

The HDD 15 receives the instruction signal at the internal CPU 152, and the magnetic head 51 is allowed to move in response to an instruction from the internal CPU 152. As described above, according to the embodiment, voltage values of the two power supply lines, the backup line 251 and the ACC power supply line 252 may be monitored to surely detect the start of the engine, and then the magnetic head 51 of the HDD 15 is allowed to move.

Therefore, the emergency unloading by the momentary shutoff caused at the start of the engine can be avoided, and the collision between the magnetic head 51 and the ramp 55 at the start of the engine can be prevented. Note that in the above described embodiment, the magnetic head 51 is allowed to move after the start of the engine, while the power supply for the HDD may be kept off before the start of the engine, and the HDD may be turned on after the start of the engine is detected by the above described part. A method of detecting the start of the engine using power supply lines connected to the key switch will be now described.

Figure 8:
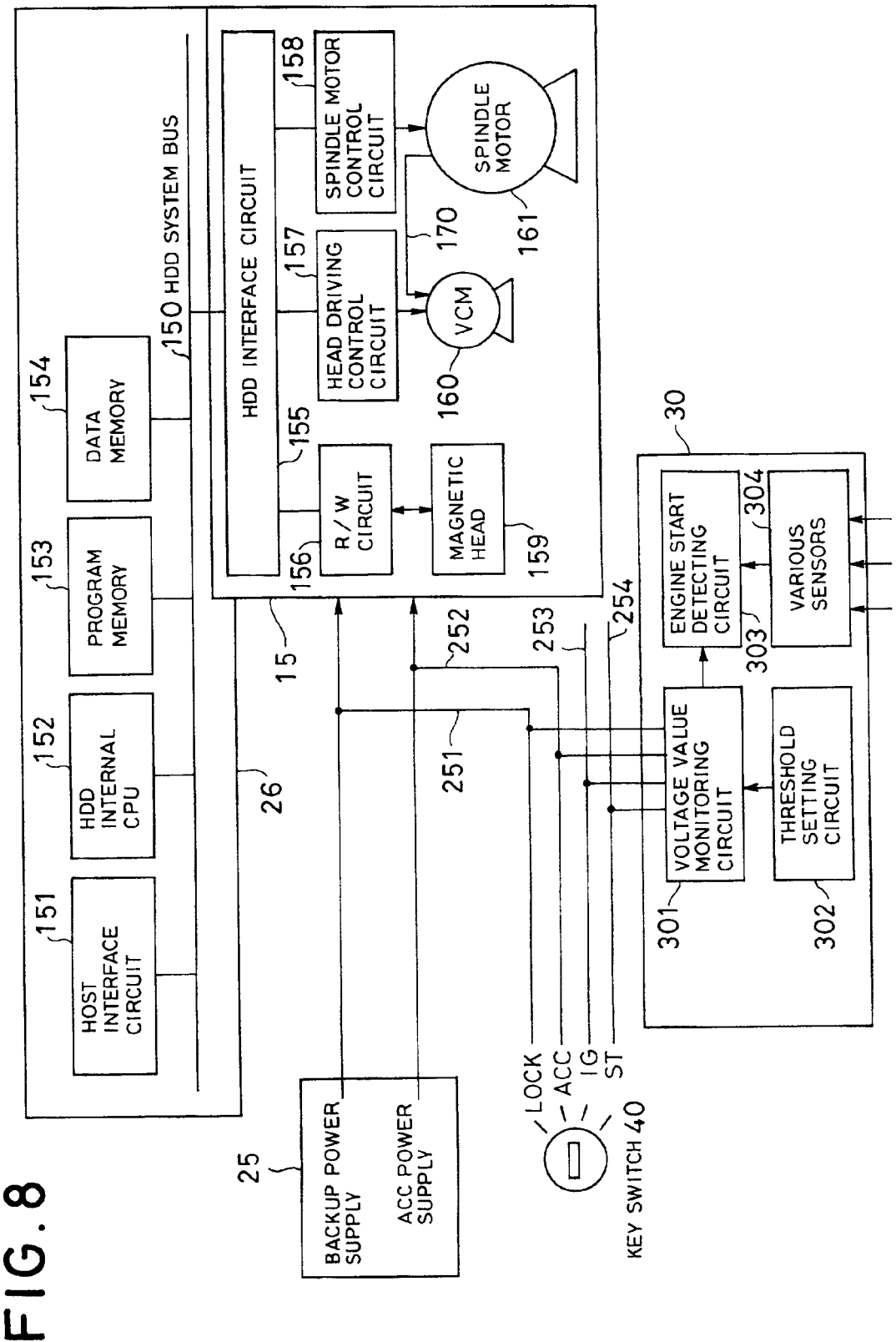
FIG. 8 is a block diagram showing an embodiment including a circuit for monitoring a voltage on each power supply line connected to a key switch added to the embodiment shown in FIG. 6.
Figure 9:
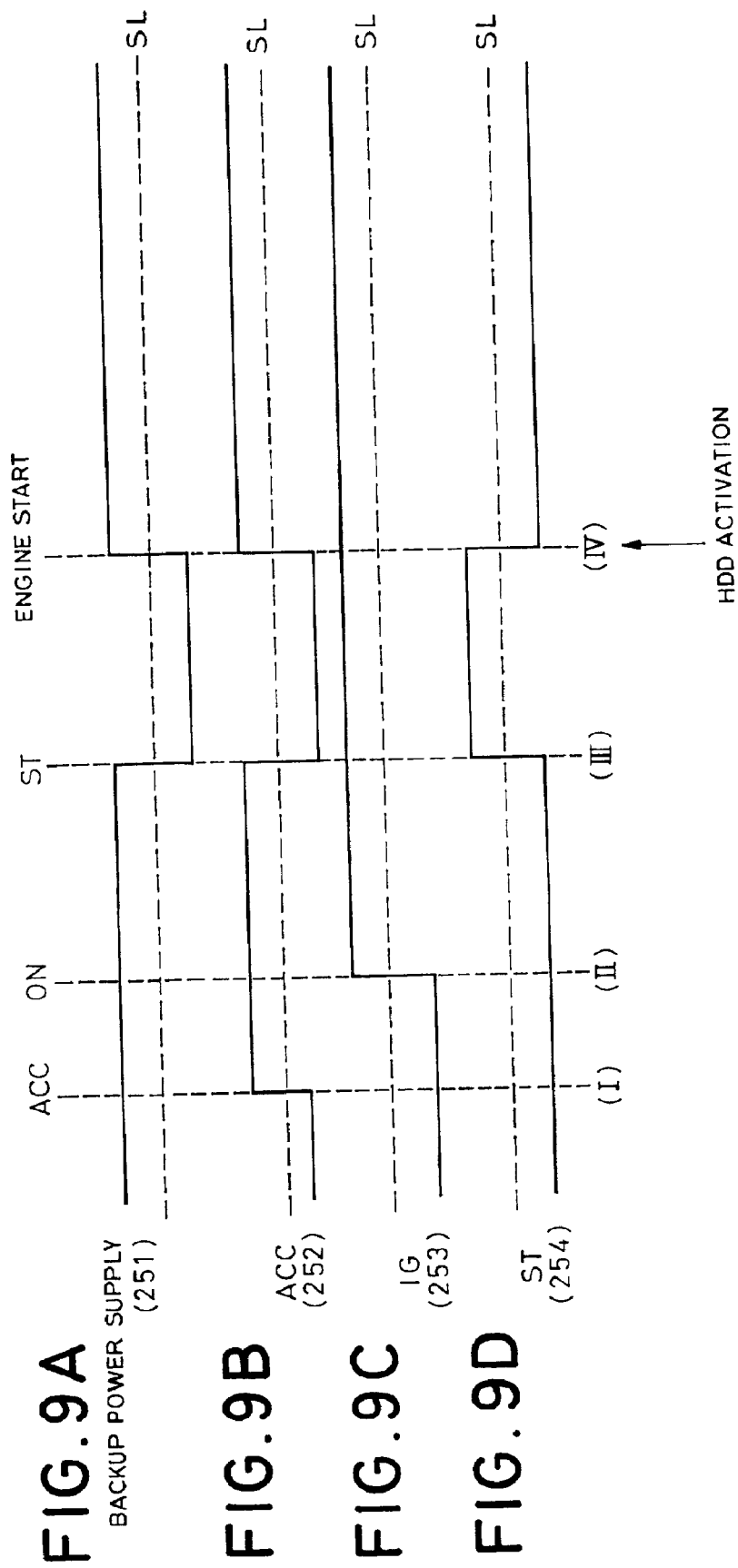
FIGS. 9A to 9D are timing charts for illustrating the operation of the engine start detecting device shown in FIG. 8.

FIG. 8 is a diagram of the configuration in FIG. 6 having additionally provided power supply lines connected to the key switch 40. In FIG. 8, the members denoted by the same reference characters as those in FIG. 6 achieve the same operation, and therefore will not be described.

As shown in FIG. 8, the key switch 40 is connected with a backup power supply line 251 and an ACC power supply line 252, a power supply line 253, and a power supply line 254. The backup power supply line 251, the ACC power supply line 252, and the power supply line 253 indicate voltage values when the engine key is at the LOCK position, the ACC position, the IG position, respectively. The power supply line 254 indicates a voltage value when the engine is started.

FIGS. 9A to 9D are timing charts for use in illustration of the timing of detecting the start of the engine by the engine start detecting device 30. FIGS. 9A, 9B, 9C and 9D represent the voltage waveforms on the backup power supply line 251, the ACC power supply line 252, the IG power supply line 253 and the ST power supply line 254, respectively. A threshold value SL is a prescribed voltage value, 9V for example according to the embodiment. This is set so that the voltage value at the momentary shutoff in a vehicle is lower than the value SL.

The driver inserts the engine key to the LOCK position to release the lock, then turns the engine key to the ACC position (I). This causes the ACC power supply to be on and raised to for example 12V. Then, when the engine key is turned to the ON position (II), the IG power supply is raised and a power supply voltage is supplied for example to the power window or the like. Then, when the engine key is turned to the ST position (III), the starter-motor starts and the voltages on the backup power supply line 251 and the ACC power supply line 252 both fall, and the ST power supply is raised. After a prescribed time period, the engine starts (IV), and the ACC power supply line 252 and the backup power supply line 251 are raised to the original voltage values, and the ST power supply falls, and a steady state is regained. Note that the time period between the ACC position, the starter-motor start and the start of the engine is random. Here, in order to surely avoid the emergency unloading, the start of the engine (the position of IV) needs only be detected and then an activation instruction may be applied to the HDD. Therefore, the engine start detecting circuit 303 monitors whether or not the value on the ACC power supply line 252 or the IG line 253 exceeds the prescribed threshold value SL through the voltage value monitoring circuit 301. A value beyond the threshold value SL indicates that the engine key is at the ACC or IG position, and therefore it is then monitored whether or not the engine is provided with a power supply. More specifically, the engine start detecting circuit 303 monitors the voltage value on the backup power supply line 251 through the voltage value monitoring circuit 301 and determines if the voltage value on the back up power supply line 251 is lower than the prescribed threshold value SL. Here, it would be possible to monitor whether the two power supply lines, i.e., the backup power supply line 251 and the ACC power supply line 252 are both lower than the prescribed threshold value SL, while monitoring only the ACC power supply line 252 does not allow the engine start to be surely detected. This is because the engine key could be returned from the ACC position to the key LOCK position. Therefore, after the value on the backup power supply line 251 exceeds the prescribed threshold value SL, the backup power supply line 251 or the two power supply lines, i.e., the backup power supply line 251 and the ACC power supply line 252 must be monitored.

Whether or not a power supply is provided for starting the engine may be determined based on the voltage value on the ST power supply line 254. More specifically, the ST power supply line 254 rises only when a power supply is provided for starting the engine, and therefore the voltage value can be monitored for the purpose.

When the value on the backup power supply line 251 or the values on the backup power supply line 251 and the ACC power supply line 252 are lower than the prescribed threshold value SL, the engine key has come to the ST position (III) through the ACC position (I) and the ON position (II). Then, it is monitored if the engine starts. More specifically, the engine start detecting circuit 303 monitors the voltage value on the backup power supply line 251 through the voltage value monitoring circuit 301, and determines whether or not the voltage value on the backup power supply line 251 exceeds the prescribed threshold value SL. If the voltage value exceeds the threshold value SL, the engine has started, and therefore an engine start instruction signal is provided to the HDD 15. The engine start may be detected by monitoring whether the values on the two power supply lines, i.e., the backup power supply line 251 and the ACC power supply line 252 exceed the prescribed threshold value SL. Alternatively, it can be monitored whether the value on the ST power supply line 254 is lower than the prescribed threshold value SL.

The HDD 15 receives the instruction signal at the internal CPU 152 and then the magnetic head is allowed to move in response to an instruction from the internal CPU 152.

As described above, according to the embodiment, the voltage values at the four power supply lines, i.e., the backup power supply line 251, the ACC power supply line 252, the IG power supply line 253, and the ST power supply line 254 are monitored to surely detect the start of the engine, and then the magnetic head 51 of the HDD 15 is allowed to move.

Therefore, emergency unloading by a momentary shutoff caused at the start of the engine can be avoided, and the collision between the magnetic head 51 and the ramp 55 at the start of the engine can be prevented. Note that in the above embodiment, a control method to allow the magnetic head 51 to move after the engine start, while the HDD can be kept off before the engine start and then turned on after the start of the engine is detected by the above described part.

Figure 10:
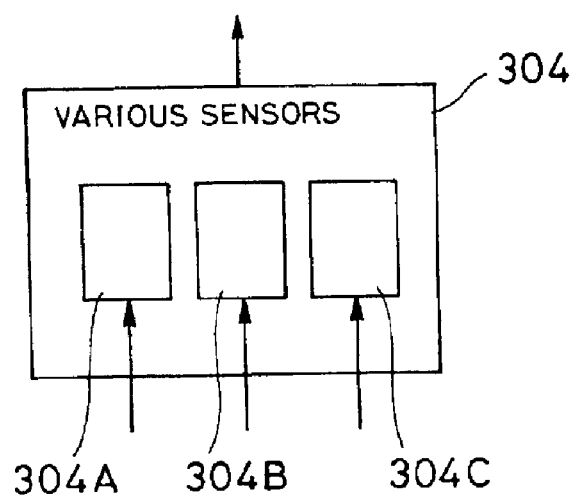
FIG. 10 is a schematic view of a specific example of various sensors shown in FIG. 8.

The foregoing description is related to the detection of the engine start by monitoring any of voltage values at the four power supply lines 251 to 254 using the engine start detecting device 30. Meanwhile, as shown in FIG. 10, the engine start can be detected based on any of the outputs of the following sensors 304A to 304C.

Detection Based on the Output of the Tachometer 304A

The engine start detecting device 30 monitors the engine revolution through the engine start detecting circuit (microcomputer) 303 and obtains information from the tachometer through an A/D converting circuit which is not shown. Then, the engine start detecting device 30 determines that the engine has started if the continuous engine revolution has been detected for a certain period.

Sensing Using an Engine Sound Detector 304B

Engine sounds are detected inside and outside the vehicle using an engine sound detector 304B, the detected sound is subjected to frequency conversion at the engine start detecting circuit (microcomputer) 303, and the engine start is determined if a frequency spectrum representing the engine revolution is detected for a prescribed time period or longer.

Sensing Based on Vibration Information

Vibration information is sensed using a vibration sensor 304C. The engine start detecting circuit (microcomputer) 303 determines that the engine has started if the difference in the vibration information between the engine inactive state and the engine active state is detected for a prescribed time period or longer.

Detecting Based on the Output of the Generator

The engine start detecting circuit (microcomputer) 303 obtains information about whether or not the generator operates, and determines the engine start based on the operation for a prescribed time period or longer. The engine start detecting circuit (microcomputer) 303 corresponding to a hybrid car obtains information about starter-motor activation and detects the engine start.

Note that the foregoing description is related to the detection of the engine start using the various sensor outputs followed by the activation of the HDD. Meanwhile, the HDD may be activated in a timing after the vehicle starts moving. In this case, the sensor 16 provided as part of a car navigation system for example may be used to detect the traveling of the vehicle. According to one method, a vehicle speed pulse may be detected. The generation state of the vehicle speed pulse and the timing of activating the HDD are represented in the timing chart in FIG. 11.

Figure 11:
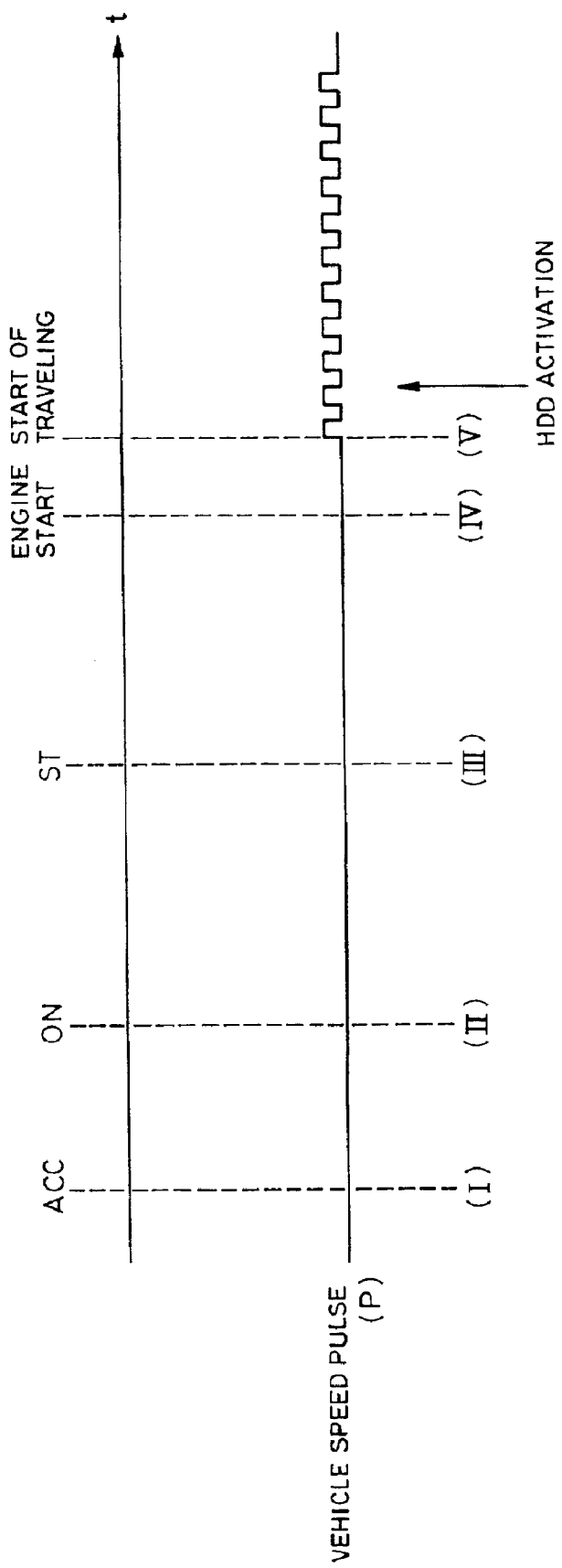
FIG. 11 is a timing chart for use in illustration of the relation between the generation state of a vehicle speed pulse and the activation of an HDD.

In FIG. 11, once the engine key has been inserted followed by the process from (I) to (IV), the engine starts and the vehicle starts moving (V), and an output signal P for the vehicle speed pulse is generated. The pulse signal may be detected by a traveling detection circuit which is not shown and the traveling of the vehicle is detected. Based on the detection signal, the HDD is activated.

Another method of detecting the traveling state of the vehicle is based on the output of a gyro sensor, the OFF output of a parking brake and the like.

As described above, according to the embodiment, based on the output signals of the various sensors which can be used for detecting the traveling state, the traveling of the vehicle is surely detected, and then the magnetic head 51 of the HDD 15 is allowed to move.

As a result, emergency unloading by a momentary shutoff caused at the start of the engine can be avoided, and the collision between the magnetic head 51 and the ramp 55 at the start of the engine can be prevented. Note that in the embodiment, the magnetic head 51 is allowed to move after the vehicle starts moving, while the HDD may be kept off before the vehicle starts moving and turned on after the vehicle starts moving by the above described part.

As in the foregoing, according to the embodiment, the HDD is activated after the vehicle engine starts or after the vehicle starts moving, and therefore emergency unloading at the start of the engine can surely be avoided. However, since map data is not displayed on the monitor screen until the HDD is activated, the user might feel insecure. Therefore, in the navigation system according to the embodiment, during the period between the ACC and ON states to the start of the engine, a map stored in the backup RAM 27 and indicating the position of the vehicle the last time the engine has stopped is preferably displayed. Besides the navigation system, in an HDD integrated music information reproducing apparatus for vehicle, information (such as index information) to specify music information performed at the previous engine interruption which has been stored in the backup RAM 27 is preferably displayed.

As described above, according to the present invention, in the HDD for vehicle, the HDD is activated or the head is driven after the engine start is detected or after the vehicle starts traveling. Therefore, emergency unloading can be prevented at the start of the engine. The reduction in emergency unloading occurrence can reduce the number of collisions between the head and the ramp, so that a disk drive device for vehicle having a head with a prolonged life and improved reliability as an HDD may be provided.

According to the first aspect of the present invention, a disk drive device is driven after the start of the engine in the vehicle is detected by the engine start detecting part, and therefore emergency unloading at the start of the engine can be avoided. As a result, the reduction in emergency unloading occurrence can reduce the number of collisions between the head and the ramp, so that the head has a prolonged life and the disk drive device may have improved reliability as an HDD.

According to the second aspect of the present invention, after an engine start in a vehicle is detected by the engine start detecting part, the movement of the head by the head driving part is allowed. Therefore, the HDD becomes accessible after the engine is activated, so that emergency unloading at the start of the engine can be prevented, and the reduction in emergency unloading occurrence reduces the number of collisions between the head and the ramp. As a result, the head may have a prolonged life and the disk drive device may have improved reliability as an HDD.

According to the third and fourth aspects of the invention, the head can surely be returned to the retreat position if the power supply is interrupted, and therefore the HDD including the head can be prevented from being critically damaged.

According to the fifth and sixth aspects of the present invention, the engine start can be detected by monitoring the voltages, and the HDD is activated or the head is allowed to move after the detection. Therefore, emergency unloading at the start of the engine can be prevented, and the reduction in emergency unloading occurrence reduces the number of collisions between the head and the ramp. As a result, the head may have a prolonged life and the disk drive device may have improved reliability as an HDD.

According to the seventh to fourteenth aspects of the present invention, the engine start can be detected based on the various sensor outputs or by detecting the traveling of the vehicle. After the detection, the HDD is activated or the head is allowed to move, so that emergency unloading can be prevented at the start of the engine, and the reduction in emergency unloading occurrence reduces the number of collisions between the head and the ramp. As a result, the head may have a prolonged life and the disk drive device may have improved reliability as an HDD.

According to the fifteenth aspect of the present invention, map information in the previous engine off state is backed up in a memory and the map information is displayed on the screen. Thus, a map is displayed as the driver waits for the HDD to be driven, and therefore the driver may be relieved from vexation during the waiting.

Figure 12:
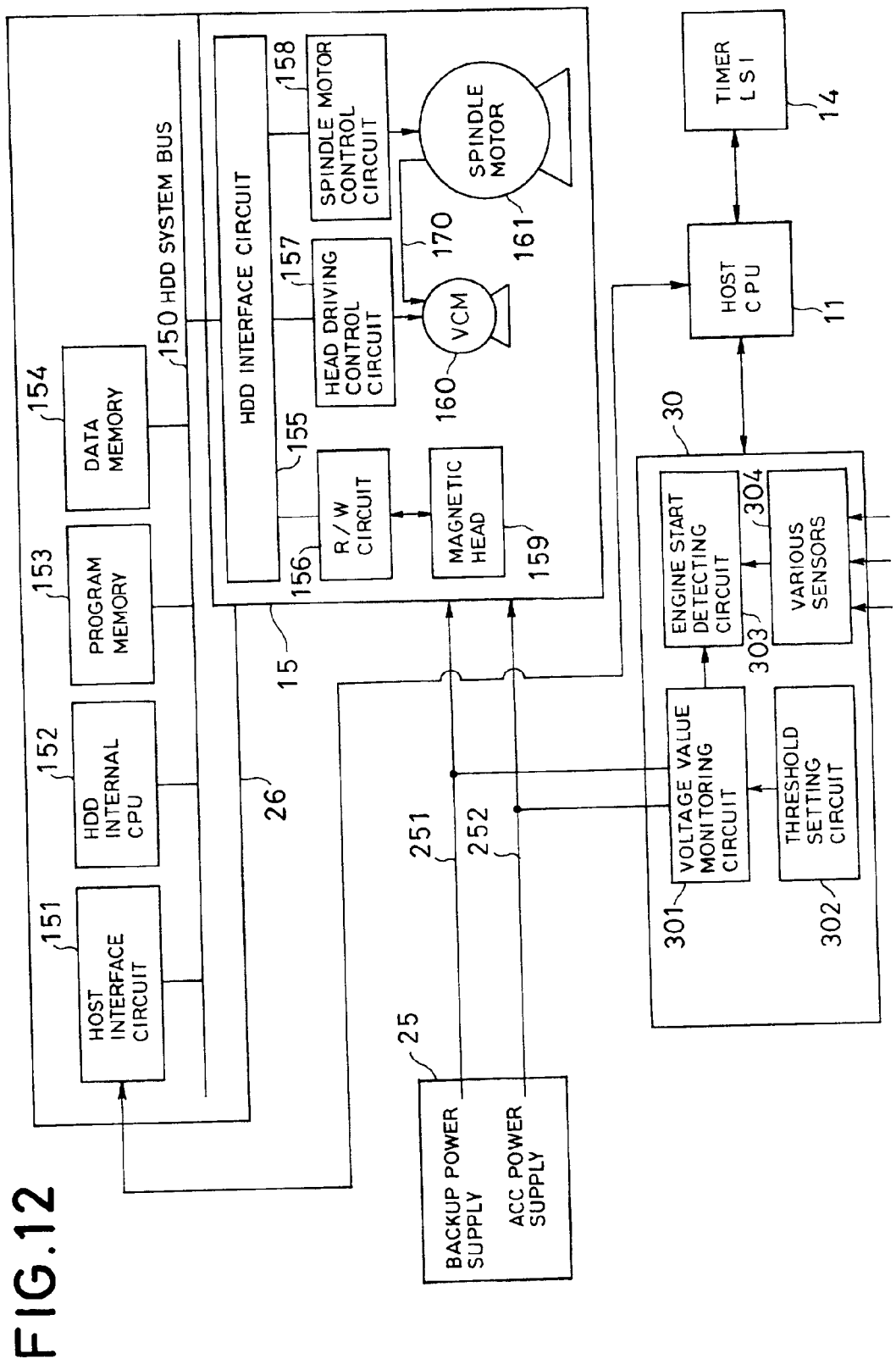
FIG. 12 is a block diagram showing an HDD in the system as shown in FIG. 5 according to another embodiment of the invention.

FIG. 12 is a diagram of a disk drive device according to another embodiment of the present invention and shows in detail the configuration of the HDD 15 and the vehicle power supply circuit 25 in FIG. 5 and the engine start detecting device 30 for detecting the start of the engine similarly to FIG. 6.

According to the embodiment, there is a timer LSI 14 which has a time count value set in a programmable manner by a host CPU 11, issues an interrupt at time up, and allows the interrupt routine to take over the processing. Here, the timing of activating the HDD after the start of the engine is specified.

The timing of activating the HDD according to the present invention will be now described in detail. According to the embodiment, at the start of the engine, the HDD is activated after a prescribed time period counted by the timer, so that the number of emergency unloading occurrence is reduced.

Figure 13:
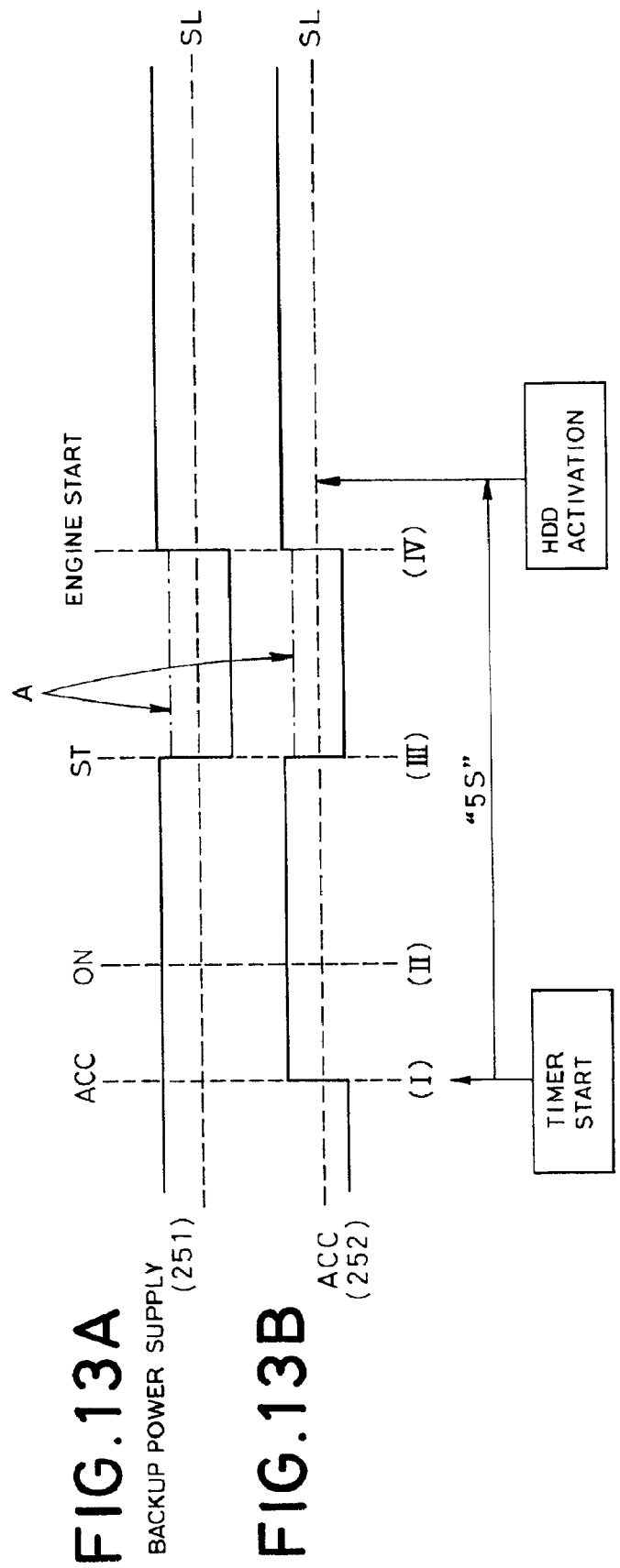
FIGS. 13A and 13B are timing charts for illustrating the timing of activating an HDD using a timer.

FIGS. 13A and 13B are timing charts for use in illustration of the timing of activating the HDD using the timer. FIG. 13A shows the voltage waveform on the backup power supply line 251 and FIG. 13B shows the voltage waveform on the ACC power supply line 252. SL (threshold value) represents a prescribed voltage value, 9V for example according to the embodiment. This voltage is set such that the voltage value at a momentary shutoff in the vehicle is lower than the voltage value SL.

The driver inserts the engine key in the LOCK position to release the lock, and turns the key to the ACC position (I). Thus, the ACC power supply rises for example to 12V, and the key is then turned to the ST position (III) through the ON position (II), which starts the starter-motor and voltage falls both on the backup power supply line 251 and the ACC power supply line 252. After a prescribed time period, the engine starts (IV), and the voltages on the ACC power supply line 252 and the backup power supply line 251 rise again to the original voltage value 12V, and a steady state is regained. Note that the time period between the ACC position, the start of the starter-motor and the start of the engine is random.

The driver inserts the engine key in the LOCK position to release the lock, and turns the key to the ACC position. Thus, the ACC power supply rises. Then, the timer LSI 14 starts counting. The starter-motor starts by the turning of the key to the ST position via the ON position, and the voltages on the backup power supply line 251 and the ACC power supply line 252 both fall. After the rotation of the starter-motor for a prescribed time period, the ACC power supply line 252 and then the backup power supply line 251 rise, and a steady state is regained. The time period between the ACC and ON positions, the start of the starter-motor and the start of the engine is random.

According to the embodiment, the timer LSI 14 is preprogrammed to count five seconds, and starts counting from the ACC position and after five seconds, an instruction to allow the magnetic head 51 to move is issued to the HDD 15 from the host CPU 11. More specifically, according to the embodiment, the timer is used because a voltage dropped part A may not be lower than the prescribed threshold value SL, and thus the number of emergency unloading occurrence can be minimum.

The HDD 15 receives the instruction signal at the internal CPU 152, and then the magnetic head 51 is allowed to move in response to an instruction from the internal CPU 152.

Note that in the embodiment described above, the magnetic head 51 is allowed to move after the timer has counted a prescribed time period, while the HDD may be kept off before the start of the engine, and turned on when the engine start is detected by the above described part.

Figure 14:
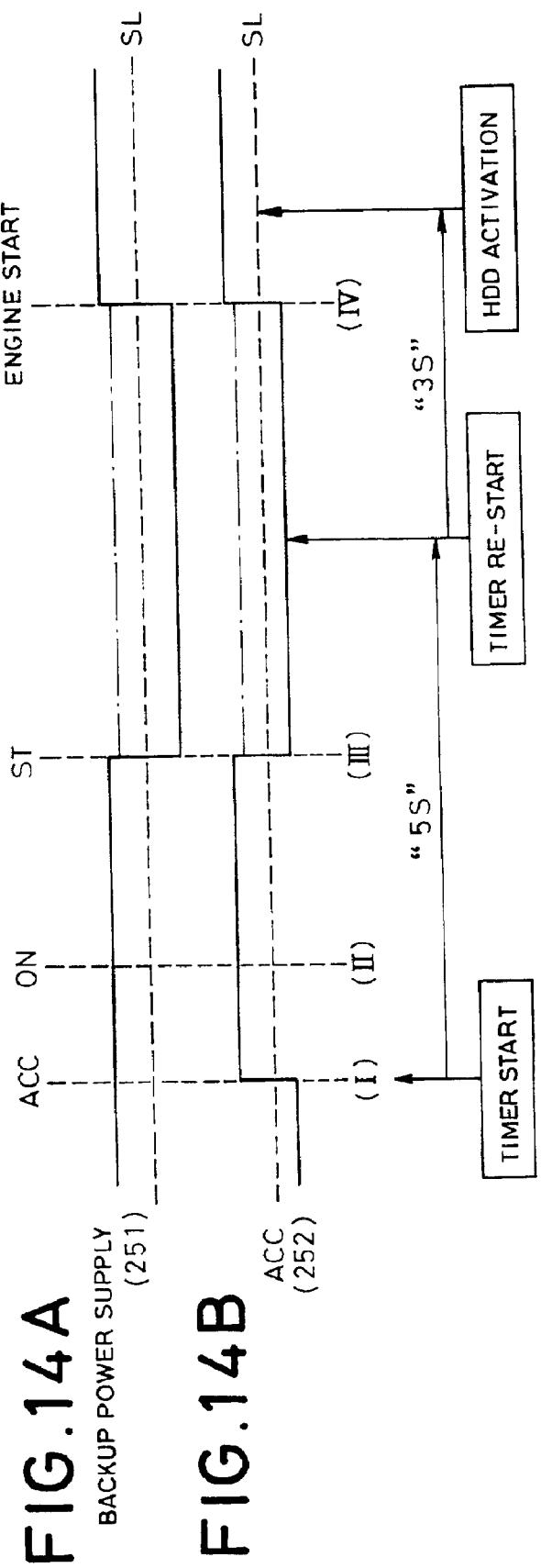
FIGS. 14A and 14B are timing charts for illustrating the timing of activating an HDD using a timer according to another embodiment of the invention.

FIGS. 14A and 14B are timing charts for use in illustration of the timing of activating the HDD using the timer. In FIGS. 14A and 14B, the members denoted with the same reference characters as those in FIGS. 13A and 13B carry out the same operation, and therefore are not described.

Here, after five seconds, the voltage value on the backup power supply line 251 or the ACC power supply line 252 is monitored and if the value is lower than the threshold value SL, the timer is restarted, and the HDD is activated after three seconds.

Thus, if the engine has not started after the set five seconds, the HDD 15 is activated after another three seconds. Therefore, it may take some time for the engine to start. This operation may be repeated a number of times.

FIGS. 15A, 15B, 16A and 16B show embodiments according to which the timer is used and the values of the power supply voltages in the vehicle are monitored and the HDD is activated when prescribed conditions are met.

Figure 15:
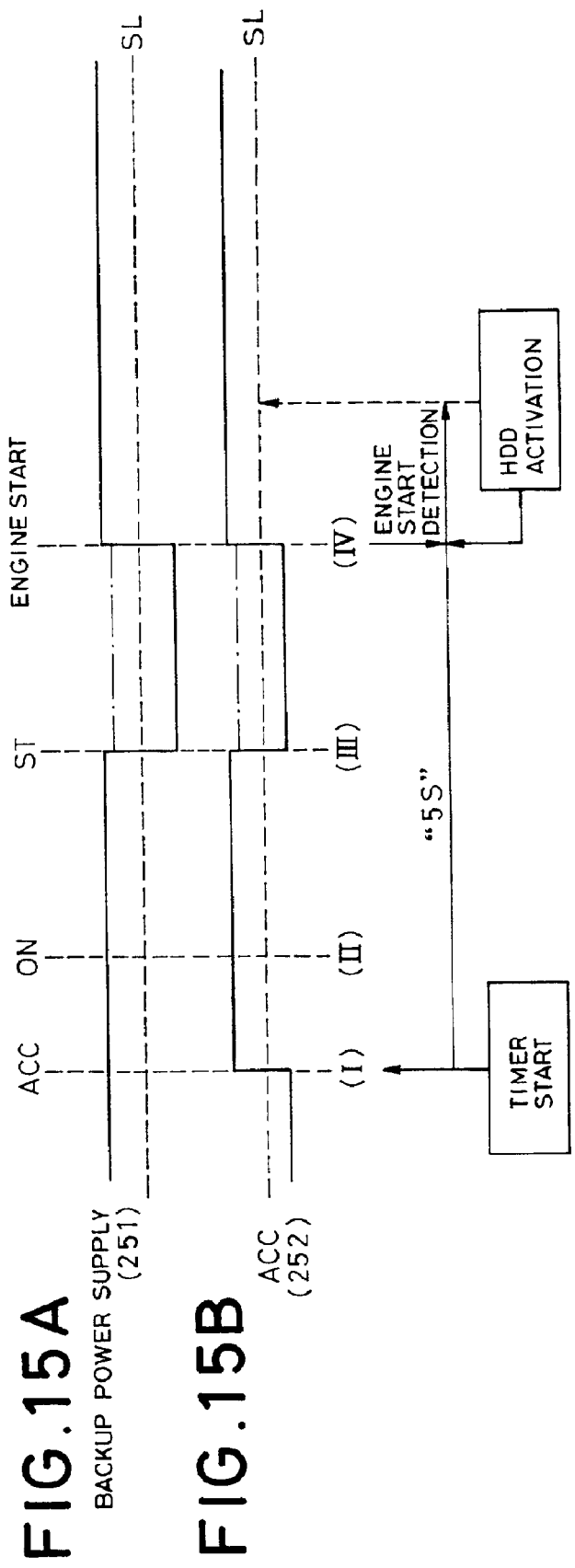
FIGS. 15A and 15B are timing charts for illustrating the timing of activating an HDD using a timer according to yet another embodiment.

According to the embodiment shown in FIGS. 15A and 15B, the power supply voltages both on the backup power supply line 251 and the ACC power supply line 252 are monitored. The driver inserts the engine key in the LOCK position to release the lock. The ACC power supply rises at the time (timing I) when the key is turned to the ACC position. Then, the voltage value monitoring circuit 301 starts monitoring the voltage values and the timer LSI 14 starts counting.

Then, when the engine key is turned to the ST position (III) to start the starter-motor, the voltages on the backup power supply line 251 and the ACC power supply line 252 both fall by the voltage dropped state described above. When the voltage values are lower than the prescribed threshold level SL, the voltage value monitoring circuit 301 can detect its monitoring voltage being lower than the prescribed threshold level SL. Thus, during the period from (III) to (IV), when the voltage values on the backup power supply line 251 and the ACC power supply line 252 are lower than the prescribed threshold level SL, the time point at which these voltage values once again exceed the threshold level SL is detected, and the start of the engine can be detected. At the time, the HDD can be activated in the engine start timing (IV). Therefore, in this case, the HDD activation by monitoring using the timer is not carried out.

Meanwhile, during the period from (III) to (IV), the voltage values on the backup power supply line 251 and the ACC power supply line 252 may not be lower than the prescribed threshold voltage level SL by a voltage drop (denoted by the chain-dotted line). In this case, the start of the engine cannot be detected by monitoring the power supply voltage values, and therefore the HDD is activated using the timer as shown in FIGS. 13A and 13B.

When the engine start is detected or after five seconds counted by the timer, an instruction to allow the magnetic head 51 to move is issued to the HDD 15 from the host CPU 11.

As described above, according to the embodiment, the timing of activating the HDD varies depending upon the voltage level at a momentary shutoff. If the voltage value at a momentary shutoff is smaller than the threshold level (such as the voltage value in FIG. 13A), the HDD is activated at the point (timing IV) when the engine start is detected based on the voltage value. Meanwhile, if the voltage value at a momentary shutoff is greater than the prescribed threshold level SL, the HDD is activated when the timer LSI 14 counts a prescribed time period. Thus, the movement of the magnetic head 51 is controlled to prevent emergency unloading.

Figure 16:
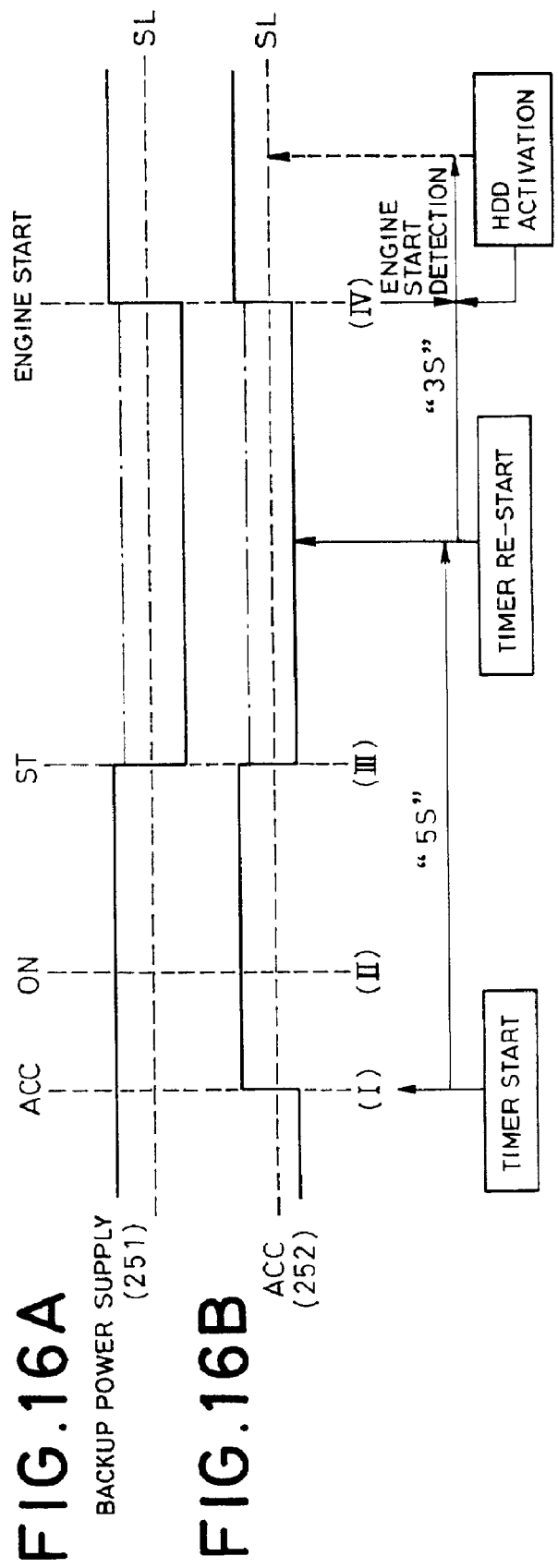
FIGS. 16A and 16B are timing charts for illustrating the timing of activating an HDD using a timer according to a still further embodiment.

In the embodiment shown in FIGS. 16A and 16B, when the engine in the vehicle has not started after a prescribed time period of five seconds following the activation of the timer LSI 14, in other words, if the voltage value on the backup power supply line 251 or the ACC power supply line 252 is still lower than the threshold value SL, the timer is restarted. Then, after a prescribed time period of another three seconds, the HDD is activated. The movement of the head is thus controlled to prevent the emergency unloading.

An embodiment will be described according to which a method of detecting an engine start using power supply lines connected to a key switch and a method of detecting an engine start using a timer are both employed to activate the HDD.

Figure 17:
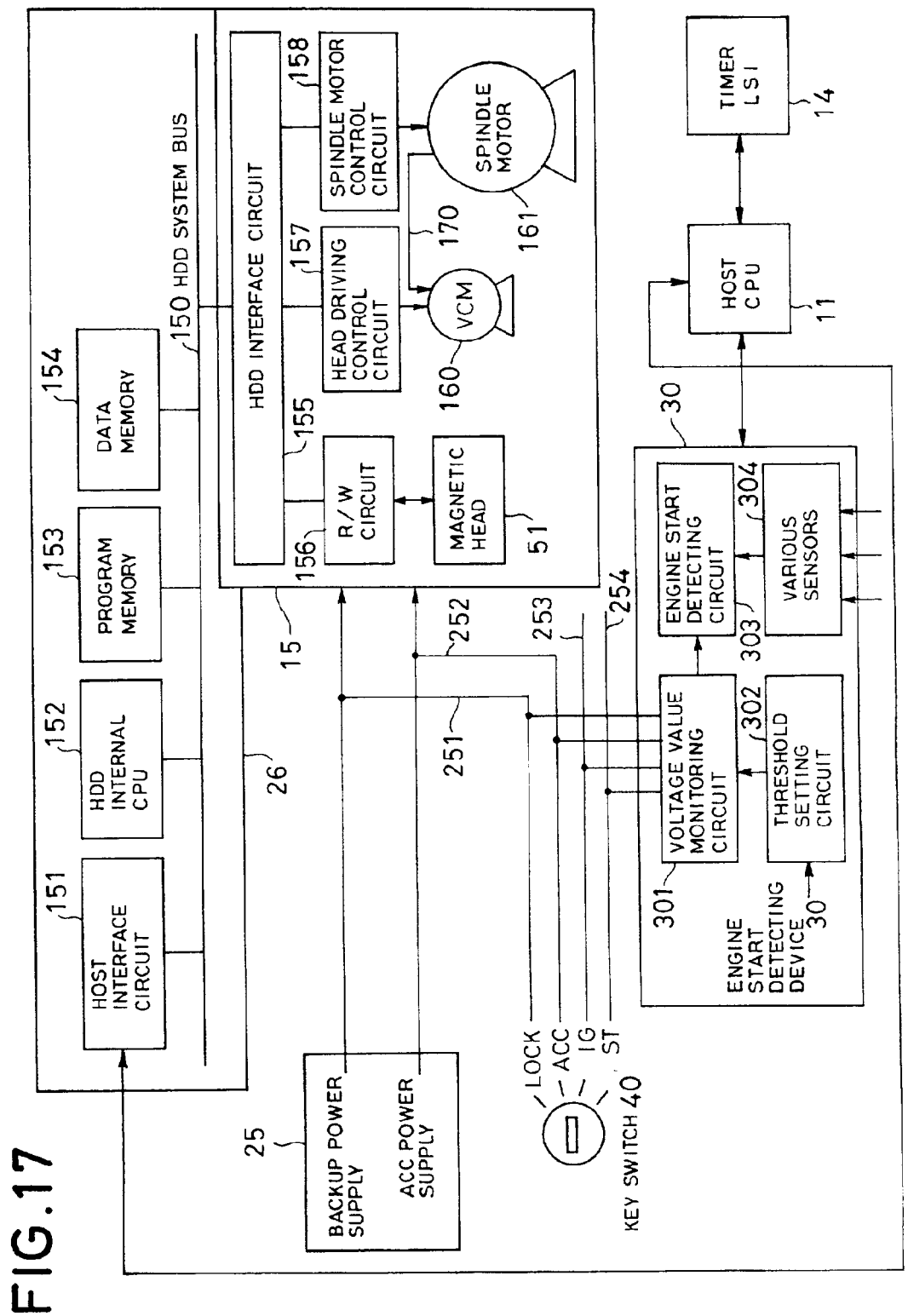
FIG. 17 is a block diagram of the embodiment as shown in FIG. 12 with an additional circuit for monitoring each power supply line connected to an IG switch.

FIG. 17 is identical to FIG. 12 with the difference being that power supply lines connected to the key switch 40 are added. In FIG. 17, the members denoted by the same reference characters as those in FIG. 12 carry out the same operation, and therefore will not be described in connection with the embodiment.

As shown in FIG. 17, the key switch 40 is connected with a backup power supply line 251, an ACC power supply line 252, a power supply line 253 and an ST power supply line 254. The backup power supply line 251, the ACC power supply line 252, and the power supply line 253 indicate battery voltage values when the engine key is at the LOCK position, the ACC position, and the IG position, respectively. The ST power supply line 254 indicates a battery voltage value when the engine is started.

FIGS. 18A to 18D are timing charts for use in illustration of an embodiment according to which the HDD is activated by both monitoring using the timer and monitoring the voltage values on the power supply lines connected to the key switch. FIGS. 18A, 18B, 18C and 18D show voltage waveforms on the backup power supply line 251, the ACC power supply line 252, the IG power supply line 253 and the ST power supply line 254, respectively. SL (threshold value) represents a prescribed voltage value, 9V for example according to the embodiment.

The driver inserts the engine key in the LOCK position to release the lock, and turns the key to the ACC position (I). Thus, the ACC power supply rises for example to 12V. At the time, the timer LSI 14 starts counting.

Then, when the engine key is turned to the ON position (II), the IG power supply rises and a power supply voltage is provided for example to a power window. Note that the timer LSI 14 may start counting at the time point (II). When the engine key is turned to the ST position (III), the starter-motor starts, the voltages on the backup power supply line 251 and the ACC power supply line 252 both fall because of a momentary shutoff, and the voltage on the ST power supply rises. At the time, the voltage value monitoring circuit 301 detects the momentary shutoff based on the monitoring voltage lower than the threshold level SL. After a prescribed time period, the engine starts (IV), and the voltage values on the backup power supply line 251 and the ACC power supply line 252 rise to the original level and the ST power supply falls, so that a steady state is regained. The voltage value in the steady state can be detected to detect the start of the engine, and therefore at the time point, an instruction to allow the magnetic head 51 to move is issued to the HDD 15 from the host CPU 11.

Meanwhile, during the period from (III) to (IV), the voltage values on the backup power supply line 251 and the ACC power supply line 252 might not be lower than the prescribed threshold level SL by a momentary shutoff (denoted by the chain-dotted line). In this case, the engine starts in a vehicle cannot be detected by monitoring the power supply voltage values, and therefore the HDD is activated using the timer as shown in FIGS. 13A and 13B.

When the engine start is detected, or when the timer has counted five seconds, an instruction to allow the magnetic head 51 to move is issued from the host CPU 11 to the HDD 15.

Whether or not a power supply voltage is provided for starting the engine can be determined based on the voltage value on the ST power supply line 254. More specifically, since the ST power supply lien 254 rises only when a power supply voltage is supplied for starting the engine, the voltage value may be monitored for determination. If the voltage value on the ST power supply line 254 is greater than the prescribed threshold level SL, and then becomes lower than the value SL, the engine start can be detected, and therefore the HDD is activated after that. Meanwhile, if the voltage value on the ST power supply line 254 is not higher than the prescribed threshold level SL, the HDD may be activated after five seconds counted by the timer.

Then, when the engine start is detected or after the five seconds counted by the timer, an instruction to allow the magnetic head 51 to move is issued from the host CPU 11 to the HDD 15.

As in the foregoing, according to the embodiment, the voltage values on the four power supply lines, i.e., the backup power supply line 251, the ACC power supply line 252, the IG power supply line 253 and the ST power supply line 254 are monitored to surely detect the start of the engine, and the movement of the magnetic head 51 of the HDD 15 is allowed after the detection. Alternatively, time monitoring is additionally carried out using the timer LSI 14, when conditions of one of the monitoring methods are met, an instruction to allow the magnetic head 51 to move is issued from the host CPU 11 to the HDD 15.

Therefore, emergency unloading caused by a momentary shutoff at the start of the engine can be avoided, and the collision between the magnetic head 51 and the ramp 55 at the start of the engine can be prevented. Note that in the above embodiments, after the engine start, the magnetic head 51 is allowed to move, while the HDD may be kept off before the engine start and may be turned on after the engine start is detected by the above described part.

As in the foregoing, according to the embodiments, the HDD is started after the engine in the vehicle is started, and therefore the emergency unloading at the start of the engine can surely be prevented. However, since in a navigation system, for example, map data is not displayed on the monitor screen before the HDD is activated, the user might feel insecure. Therefore, during the period between the ACC and ON states and the start of the engine, a map stored in the backup RAM and indicating the position of the vehicle the last time the engine is stopped is preferably displayed. Besides the navigation system, in an HDD integrated music information reproducing apparatus, information (such as index information) to specify music information performed at the previous engine interruption which has been stored in the backup RAM 27 is preferably displayed.

As described above, according to the present invention, in a disk drive device driven using a power supply voltage in a vehicle, the start of the engine can be determined by timer monitoring even for a vehicle with no voltage drop at the start of the engine. Meanwhile, for a vehicle with a voltage drop, the disk drive device may be started in an earlier timing. By allowing the head to move after the detection time point, the emergency unloading at the start of the engine can be prevented. Therefore, the number of emergency unloading can be reduced and the number of collisions between the head and the ramp is reduced. As a result, the head may have a prolonged life and the disk drive device may have improved reliability as an HDD.

This application is based on Japanese Patent Application Nos. 2000-123264 and 2000-123265 which are hereby incorporated by reference.

What is claimed is:

1. A disk drive device for recording and/or reproducing information to and/or from an information recording disk and driven by a power supply voltage in a vehicle, said disk drive device comprising an engine start detecting part for detecting an engine start of the vehicle, said disk drive device being driven only after said engine start detecting part detects an engine start of said vehicle.

2. The disk drive device according to claim 1, further comprising a voltage value monitoring circuit for monitoring voltage values on a first power supply line provided with backup power and a second power supply line provided with power when an engine key is inserted in the vehicle and turned from a first position to a second position, said engine start detecting part outputting an engine start detection signal when the monitored voltage value on said second power supply line reaches a prescribed value, following which the monitored voltage value on the first power supply line or the monitored voltage values on the first power supply line and on the second power supply line become lower than said prescribed value and then become higher than said prescribed value, based on an output value from said voltage value monitoring circuit.

3. The disk drive device according to claim 2, wherein:

said voltage value monitoring circuit monitors a voltage value on a third power supply line provided with power when the engine key is turned from the second position to a third position, and monitors a voltage value on a fourth power supply line provided with power when the engine key is turned from the third position to a fourth position, and said engine start detecting part outputs an engine start detection signal when the monitored voltage value on the second power supply line or the third power supply line reaches a prescribed value, following which the monitored voltage value on the first power supply line or the monitored voltage values on the first power supply line and on the second power supply line become lower than the prescribed value and then become higher than the prescribed value, based on an output from said voltage value monitoring circuit.

4. The disk drive device according to claim 1, wherein said engine start detecting part detects the engine start by sensing an output of an engine tachometer.

5. The disk drive device according to claim 1, wherein said engine start detecting part detects the engine start by sensing vibration of the engine inside and outside the vehicle.

6. The disk drive device according to claim 1, wherein said engine start detecting part detects the engine start by sensing an engine sound.

7. The disk drive device according to claim 1, wherein said engine start detecting part detects the engine start by sensing traveling of the vehicle based on a vehicle speed pulse.

8. The disk drive device according to claim 1, wherein said engine start detecting part detects the engine start by sensing traveling of the vehicle using a gyro sensor.

9. A The disk drive device according to claim 1, wherein said engine start detecting part detects the engine start by sensing an operation position of a parking brake.

10. The disk drive device according to claim 1, wherein said engine start detecting part detects the engine start by sensing operation of a generator in the vehicle.

11. The disk drive device according to claim 1, wherein said engine start detecting part detects the engine start by sensing activation of a starter-motor.

12. The disk drive device according to claim 1, further comprising:
 a counter for starting a counting operation based on a prescribed signal related to a key switch in the vehicle; and
 a controller for driving said disk drive device when said counter has counted a first prescribed time period.

13. The disk drive device according to claim 1, further comprising a memory, wherein information from a previous off state of the engine is backed up in said memory, and the backed-up information is provided for display on a screen in response to detection of power being provided to the second power supply line.

14. A disk drive device for recording and/or reproducing information to and/or from an information recording disk and driven by a power supply voltage in a vehicle, said disk drive device comprising:
 a head for reading and/or writing information from and/or to the information recording disk;
 a head driving part for giving driving instructions to said head;
 an engine start detecting part for detecting an engine start of said vehicle; and
 a head movement allowing part for allowing said head to be moved by instructions from said head driving part only after the engine start of the vehicle is detected by said engine start detecting part.

15. The disk drive device according to claim 14, further comprising a forcible moving part for forcibly moving said head to a retreat position when the power supply voltage to said disk drive device is interrupted.

16. The disk drive device according to claim 15, further comprising a spindle motor for rotating the recording disk, wherein:
 said forcible moving part forcibly moves said head to the retreat position by providing said head driving part with counter electromotive force generated by inertial rotation of said spindle motor.

17. A disk drive device driven by a power supply voltage in a vehicle, said disk drive device comprising:
 a head for reading/writing information from/to a recording medium mounted to said disk drive device;
 a head driving part for giving a driving instruction to said head;
 a counter for starting a counting operation based on a prescribed signal related to a key switch in the vehicle; and
 a head movement allowing part for allowing said head to be moved by the given driving instruction from said head driving part when said counter has counted a prescribed time period.

18. A disk drive device driven by a power supply voltage in a vehicle, said disk drive device comprising:
 a counter for starting a counting operation based on a prescribed signal related to a key switch in the vehicle; and
 a controller for driving said disk drive device when said counter has counted a first prescribed time period.

19. The disk drive device according to claim 18, further comprising a power supply part for providing a power supply voltage to said disk drive device in connection with the key switch in the vehicle, wherein:
 said counter starts the counting operation after the power supply voltage from the power supply part is provided to said disk drive device by the key switch.

20. The disk drive device according to claim 19, further comprising a voltage value monitoring circuit for monitoring a voltage value at said power supply part, wherein:
 said controller detects a voltage value result at said voltage value monitoring circuit after the first prescribed time period, controls said counter to count a second prescribed time period when the voltage value is lower than a prescribed value when the voltage value result is detected, and drives said disk drive device when said counter has counted the second prescribed time period.

21. The disk drive device according to claim 19, further comprising a forcible moving part for forcibly moving said head to a retreat position when the power supply voltage to said disk drive device is interrupted.

22. The disk drive device according to claim 21, further comprising a spindle motor for rotating the recording medium, wherein:
 said forcible moving part forcibly moves said head to the retreat position by providing said head driving part with counter electromotive force generated by inertial rotation of the spindle motor.

23. The disk drive device according to claim 18, further comprising an engine start detecting part for detecting an engine start of the vehicle, wherein:
 said disk drive device is driven when an engine start of the vehicle is detected by said engine start detecting part during the operation of said counter counting the first prescribed time period.

24. A disk drive device for recording and/or reproducing information to and/or from an information recording disk and driven by a power supply voltage in a vehicle, said disk drive device comprising a sensor for detecting a vehicle condition indicative of an engine start of the vehicle, said disk drive device being driven only after said sensor detects the condition to indicate an engine start of the vehicle.

25. A disk drive device driven by a power supply voltage in a vehicle, said disk drive device comprising:
 a power supply part for providing a power supply voltage to said disk drive device in response to operation of a key switch in the vehicle;

a counter for starting a counting operation to count a first prescribed time period after the power supply voltage from the power supply part is provided to said disk drive device;

a voltage value monitoring circuit for monitoring a voltage value at said power supply part; and a controller responsive detection of a voltage value result by said voltage value monitoring circuit after said counter has counted the first prescribed time period, for controlling said counter to count a second prescribed time period when the voltage value is lower than a prescribed value, and for driving said disk drive device when said counter has counted the second prescribed time period.

* * * * *